US012169371B2

(12) United States Patent
An

(10) Patent No.: US 12,169,371 B2
(45) Date of Patent: Dec. 17, 2024

(54) IMAGE FORMING APPARATUS

(71) Applicant: CANON KABUSHIKI KAISHA, Tokyo (JP)

(72) Inventor: Koji An, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/122,414

(22) Filed: Mar. 16, 2023

(65) Prior Publication Data

US 2023/0297003 A1 Sep. 21, 2023

(30) Foreign Application Priority Data

Mar. 17, 2022 (JP) ................................ 2022-042224

(51) Int. Cl.
*G03G 15/02* (2006.01)

(52) U.S. Cl.
CPC ................................ *G03G 15/0275* (2013.01)

(58) Field of Classification Search
CPC ............ G03G 15/0266; G03G 15/043; G03G 15/1675; G03G 21/08; G03G 15/0189
See application file for complete search history.

(56) References Cited

U.S. PATENT DOCUMENTS

| | | | |
|---|---|---|---|
| 7,580,654 B2 | 8/2009 | Okubo | |
| 9,835,970 B2 | 12/2017 | Shibuya et al. | |
| 2017/0031258 A1* | 2/2017 | Agata | G03G 15/553 |
| 2020/0004194 A1* | 1/2020 | Noguchi | G03G 21/0011 |

FOREIGN PATENT DOCUMENTS

| | | |
|---|---|---|
| JP | 2001-142365 A | 5/2001 |
| JP | 2002-162801 A | 6/2002 |
| JP | 2002-333811 A | 11/2002 |
| JP | 2007-094387 A | 4/2007 |
| JP | 2015-135489 A | 7/2015 |

* cited by examiner

*Primary Examiner* — Jessica L Eley
(74) *Attorney, Agent, or Firm* — Venable LLP

(57) ABSTRACT

An image forming apparatus includes first and second image forming portions, a power source portion, and a controller. The power source portion is constituted so that when the power source portion applies a charging voltage to a first charging member of the first image forming portion, the charging voltage is also applied to a second charging member of the second image forming portion. The controller carries out control so that a timing of a start of discharge of a first photosensitive drum in the first image forming portion is made earlier than a timing of a start of image formation by the first image forming portion and so that a timing of a start of discharge of a second photosensitive drum in the second image forming portion is made earlier than a timing of a start of image formation by the second image forming portion.

11 Claims, 13 Drawing Sheets

(a)

(b)

IMAGE FORMING APPARATUS

FIELD OF THE INVENTION AND RELATED ART

The present invention relates to an image forming apparatus, such as a printer or a copying machine, of an electrophotographic type in which an image is formed on a recording material.

Conventionally, as the image forming apparatus such as the copying machine or a laser beam printer, an image forming apparatus with a constitution including an intermediary transfer member has been known. In the image forming apparatus including the intermediary transfer member, in a primary transfer step, a toner image formed on a surface of a photosensitive drum which is an image bearing member is transferred onto the intermediary transfer member by applying a transfer voltage to a primary transfer member provided opposed to the photosensitive drum. In a full-color printer for forming a color image with toners of a plurality of colors, toner images consisting of the plurality of colors are formed on a surface of the intermediary transfer member by superposing the toner images of the plurality of colors on each other. Further, in a secondary transfer step, the toner images formed on the surface of the intermediary transfer member are transferred onto a recording material such as paper. Then, the toner images transferred on the recording material are fixed on the recording material by a fixing means, so that a color image is formed on the recording material.

In an image forming apparatus of a color in-line type using toner images of a plurality of colors, a plurality of charging members and a plurality of developing members are provided for forming toner images of corresponding colors on associated photosensitive drums, which are image bearing members. In order to form the toner images on the photosensitive drums, there is a need to provide power sources for supplying voltages to the charging members and the developing members, and therefore, increases in size and cost of power source circuits are unavoidable. Therefore, for example, in Japanese Laid-Open Patent Application (JP-A) 2002-162801, in order to cope with upsizing of the power source circuits and an increase in cost of the apparatus, an image forming apparatus having the following constitution has been proposed. That is, in the image forming apparatus including the plurality of charging members and the plurality of developing members, a constitution, in which commonalty of a part of a power source circuit for supplying a voltage to the plurality of charging members or the plurality of developing members is realized and thus decreases in size and cost of the power source circuit can be realized, has been proposed.

Further, in the case where residual (electric) charges are present on a surface of the photosensitive drum, a surface potential of the photosensitive drum is in a disturbed state. For that reason, by the residual charges, the surface potential of the photosensitive drum after being electrically charged by the charging member becomes non-uniform in some instances, so that an image defect which is a drum ghost occurs in some instances in a rotation cyclic period of the photosensitive drum. Therefore, in order to suppress the occurrence of the drum ghost, in JP-A 2001-142365, a constitution of a so-called pre-charging exposure device such that the surface of the photosensitive drum is irradiated with light before the charging step is performed and is discharged until the surface potential becomes a predetermined potential has been disclosed.

However, in the case where the surface of the photosensitive drum is discharged by providing the pre-charging exposure device in order to suppress generation of the drum ghost, when the photosensitive drum is irradiated with light uniformly with respect to a rotational axis direction of the photosensitive drum, the surface potential of the photosensitive drum is displaced before and after the pre-charging exposure is performed. When the photosensitive drum is rotationally driven and a light irradiation portion on the photosensitive drum by the pre-charging exposure reaches a portion in the neighborhood of the charging member, output of the charging voltage from a high-voltage power source, which is a voltage supplying source, to the charging member (hereinafter, this power source is referred to as a charging power source) is influenced by an abrupt displacement of the surface potential of the photosensitive drum. In the following, the abrupt development of the surface potential of the photosensitive drum is simply referred to as a load fluctuation. Particularly, in order to reduce a size and a cost of a power source circuit, in the case where a voltage outputted from a common power source circuit is applied to a plurality of charging members, the load fluctuation has the influence on the output of the charging voltage in the form of a sum of load fluctuations of respective stations which share the power source circuit. As a result, the charging power source which is the voltage supplying source to the charging members cannot follow the load fluctuation and an output voltage of the charging power source supplied to the charging members becomes unstable, so that overshoot generates in some cases. When the charging voltage is made high by the overshoot, there arise problems such as leakage of a current due to generation of a dielectric breakdown portion on the photosensitive drum and generation of a drum potential memory due to abnormal electric discharge in a charging portion.

SUMMARY OF THE INVENTION

The present invention has been accomplished in such circumstances. A principal object of the present invention is to suppress a fluctuation in charging voltage by pre-charging exposure.

According to an aspect of the present invention, there is provided an image forming apparatus comprising: a first image forming portion including a first photosensitive member, a first charging member configured to electrically charge a surface of the first photosensitive member, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, wherein the controller carries out control so as to change a timing of a start of discharge of the first photosensitive drum and a timing of a start of discharge of the second photosensitive drum by causing the power source portion to apply the charging voltage to the first charging member and the second charging member, and wherein the controller carries out control so that a timing of a start of discharge of the first photosensitive drum in the first image forming portion is made earlier than a timing of a start of image formation by the first image forming portion and so that a timing of a start of discharge of the second photosensitive drum in the second image forming portion is made earlier than a timing of a start of image formation by the second image forming portion.

According to another aspect of the present invention, there is provided an image forming apparatus comprising: a first image forming portion including a first photosensitive member, a first charging member configured to electrically charge a surface of the first photosensitive member, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, wherein the controller carries out control so as to change a timing of an end of discharge of the first photosensitive drum and a timing of an end of discharge of the second photosensitive drum by causing the power source portion to apply the charging voltage to the first charging member and the second charging member, and wherein the controller carries out control so that a timing of an end of discharge of the first photosensitive drum in the first image forming portion is made later than a timing of an end of image formation by the first image forming portion and so that a timing of an end of discharge of the second photosensitive drum in the second image forming portion is made later than a timing of an end of image formation by the second image forming portion.

According to another aspect of the present invention, there is provided an image forming apparatus comprising: a first image forming portion including a first photosensitive member, a first charging member configured to electrically charge a surface of the first photosensitive member in a first charging portion, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member in a second charging portion, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, wherein the controller carries out control so as to change a timing when a first region discharged when discharge of the first photosensitive drum is started reaches the first charging portion and a timing when a second region discharged when discharge of the second photosensitive drum is started reaches the second charging portion, by causing the power source portion to apply the charging voltage to the first charging member and the second charging member, and wherein the controller carries out control so that a timing of a start of discharge of the first photosensitive drum in the first image forming portion is made earlier than a timing of a start of image formation by the first image forming portion and so that a timing of a start of discharge of the second photosensitive drum in the second image forming portion is made earlier than a timing of a start of image formation by the second image forming portion.

According to another aspect of the present invention, there is provided an image forming apparatus comprising: a first image forming portion including a first photosensitive member, a first charging member configured to electrically charge a surface of the first photosensitive member in a first charging portion, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member in a first discharging portion by irradiating the surface of the first photosensitive member with light emitted from the light emitting element; a second image forming portion including a second photosensitive member, a second charging member configured to electrically charge a surface of the second photosensitive member in a second charging portion, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member in a second discharging portion by irradiating the surface of the second photosensitive member with light emitted from the light emitting element; a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, wherein the controller carries out control so as to change a timing when a first region forming the first discharging portion reaches the first charging portion immediately after discharge of the first photosensitive drum is ended and a timing when a second region forming the second discharging portion reaches the second charging portion immediately after discharge of the second photosensitive drum is ended, by causing the power source portion to apply the charging voltage to the first charging member and the second charging member, and wherein the controller carries out control so that a timing of an end of discharge of the first photosensitive drum in the first image forming portion is made later than a timing of an end of image formation by the first image forming portion and so that a timing of an end of discharge of the second photosensitive drum in the second image forming portion is made later than a timing of an end of image formation by the second image forming portion.

According to another aspect of the present invention, there is provided an image forming apparatus comprising: a first image forming portion including a first photosensitive member, a first charging member configured to electrically charge a surface of the first photosensitive member, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, and wherein the controller carries out control so as to make a timing of a start of discharge of the first photosensitive drum and a timing of a start of discharge of the second photosensitive drum the same by causing the power source portion to apply the charging voltage to the first charging member and the second charging member, and carries out control so as to stepwise change emitted light quantities of the light emitting elements of the first discharging portion and the second discharging portion.

According to a further aspect of the present invention, there is provided an image forming apparatus comprising: a first image forming portion including a first photosensitive member, a first charging member configured to electrically charge a surface of the first photosensitive member, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, and wherein the controller carries out control so as to make a timing of an end of discharge of the first photosensitive drum and a timing of an end of discharge of the second photosensitive drum the same by causing the power source portion to apply the charging voltage to the first charging member and the second charging member, and carries out control so as to stepwise change emitted light quantities of the light emitting elements of the first discharging portion and the second discharging portion.

Further features of the present invention will become apparent from the following description of exemplary embodiments with reference to the attached drawings.

Figure 5:
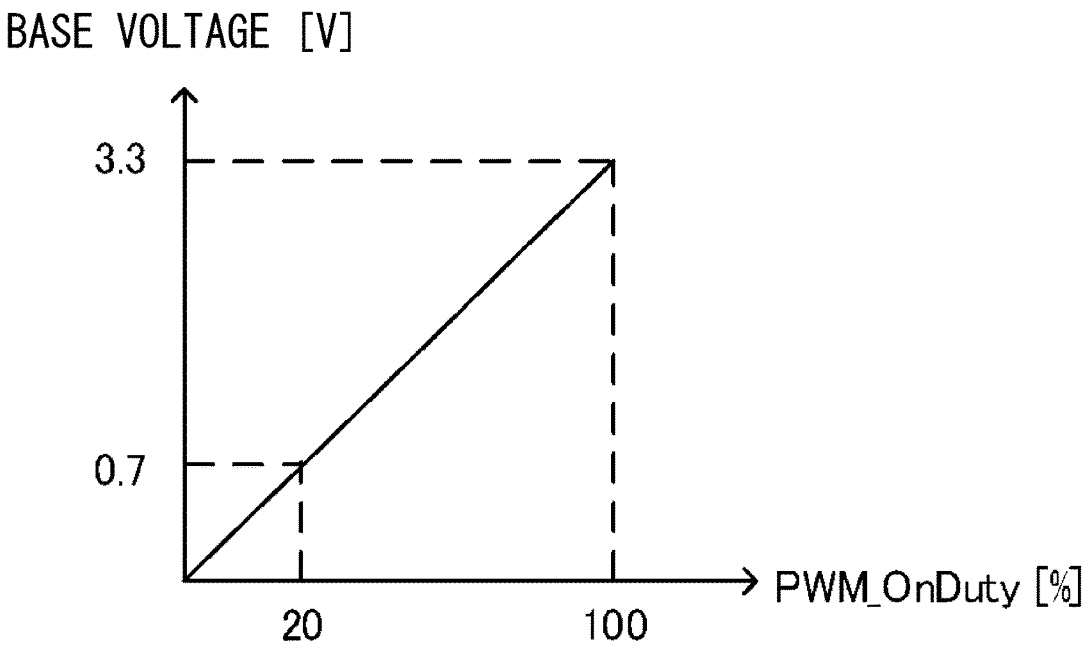
Figure 5:
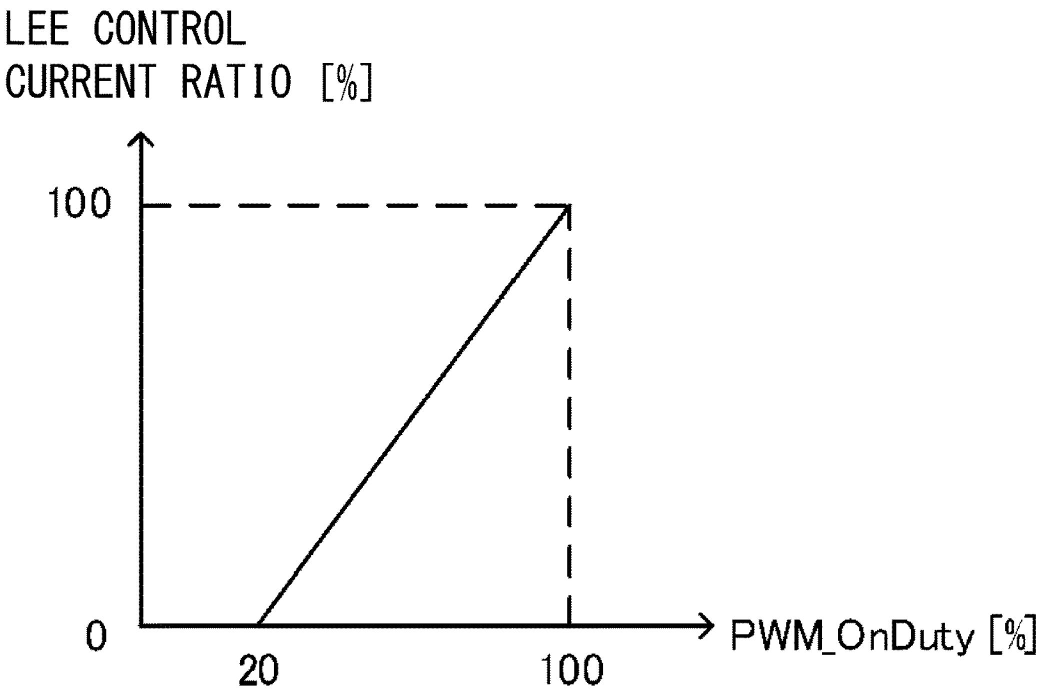

Parts (a) and (b) of FIG. 5 are graphs each showing a circuit characteristic of the light emission control circuit in the embodiments 1 to 3.

Figure 6:
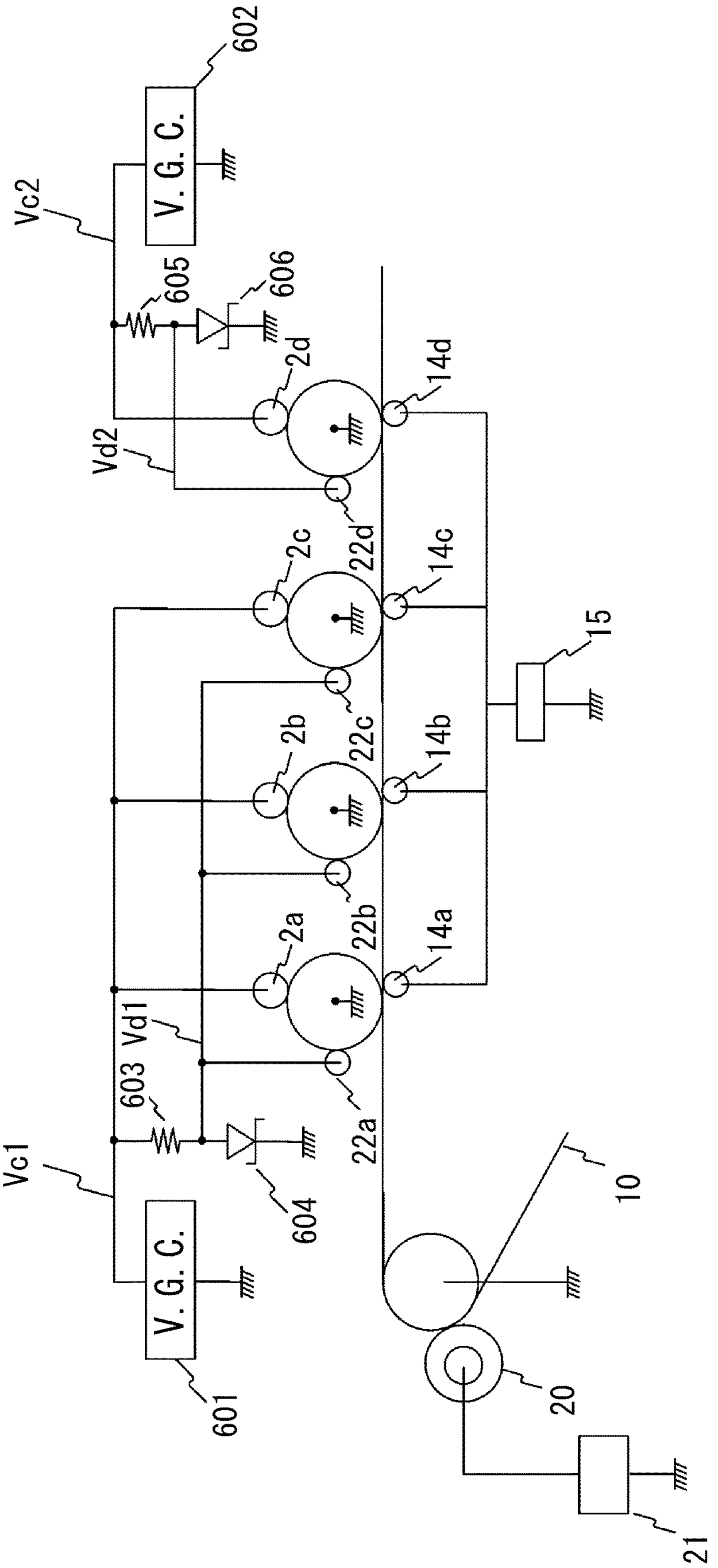

FIG. 6 is a schematic view showing a constitution of a high-voltage generating circuit of the image forming apparatus of the embodiments 1 and 2.

Figure 7:
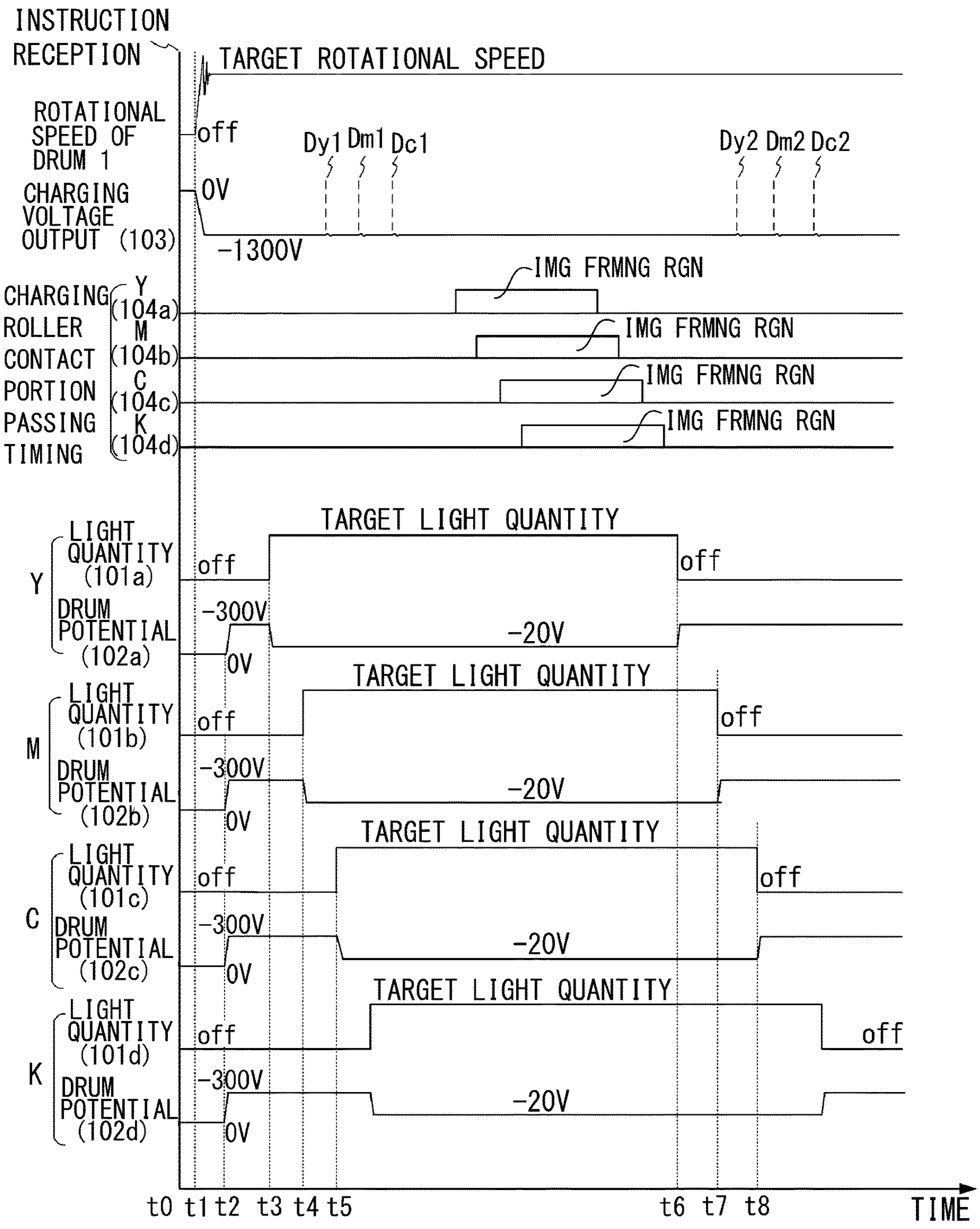

FIG. 7 is a schematic view for illustrating a light emission/light-out timing of the pre-charging exposure device in the embodiment 1.

Figure 8:
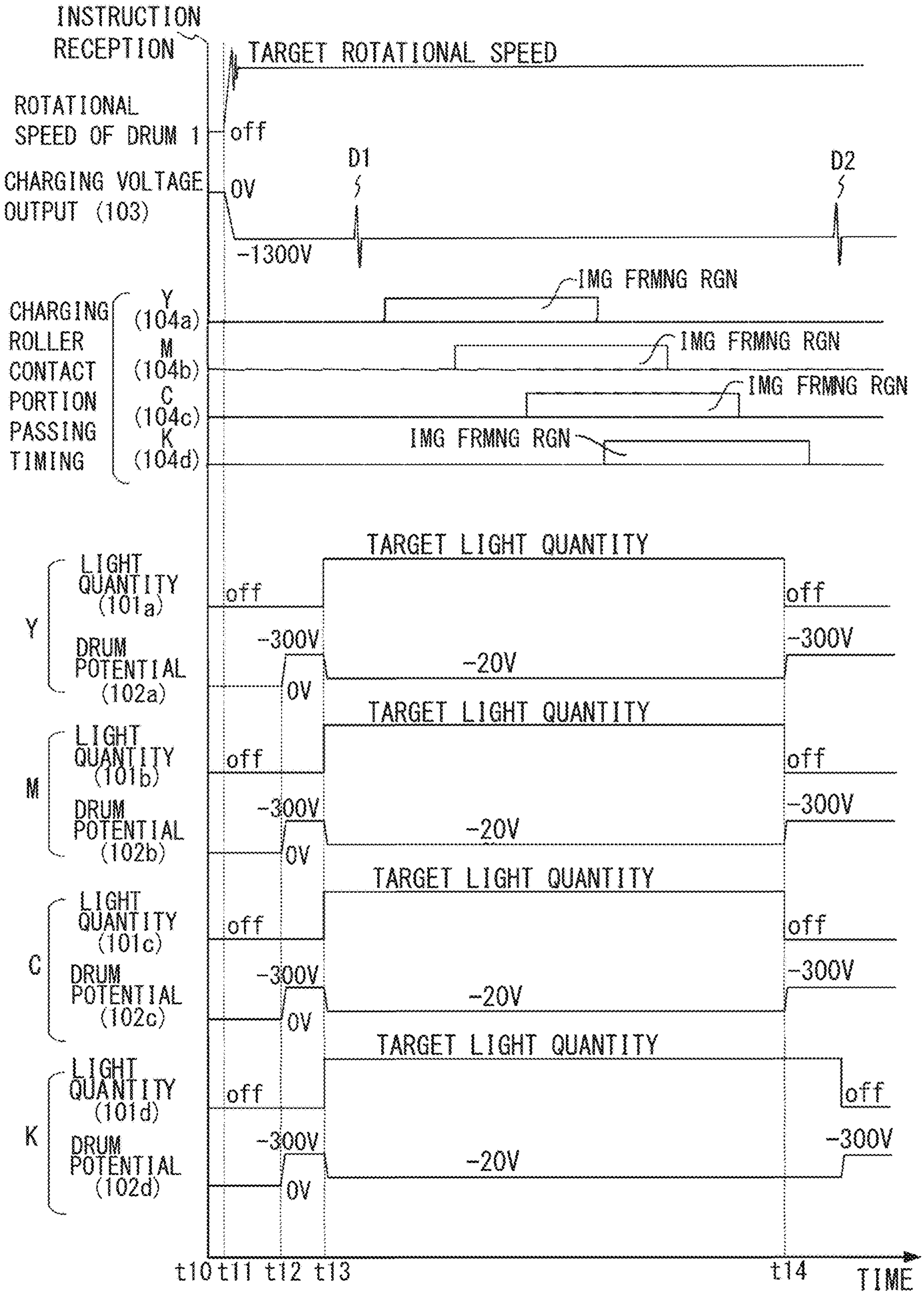

FIG. 8 is a schematic view for illustrating a light emission/light-out timing of a pre-charging exposure device for comparison with the embodiment 1.

Figure 9:
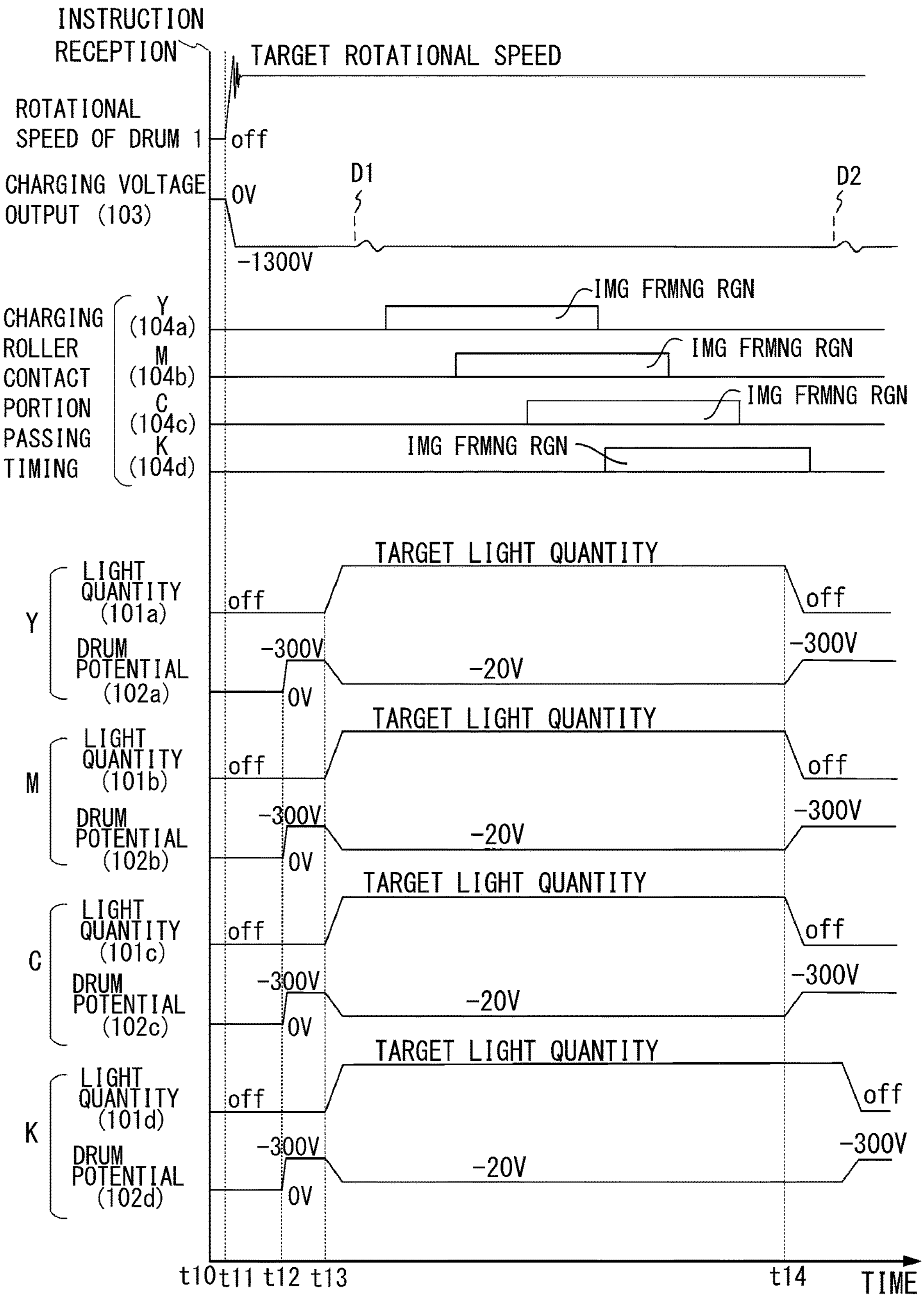

FIG. 9 is a schematic view for illustrating a light emission/light-out timing of a pre-charging exposure device in another embodiment.

Figure 10:
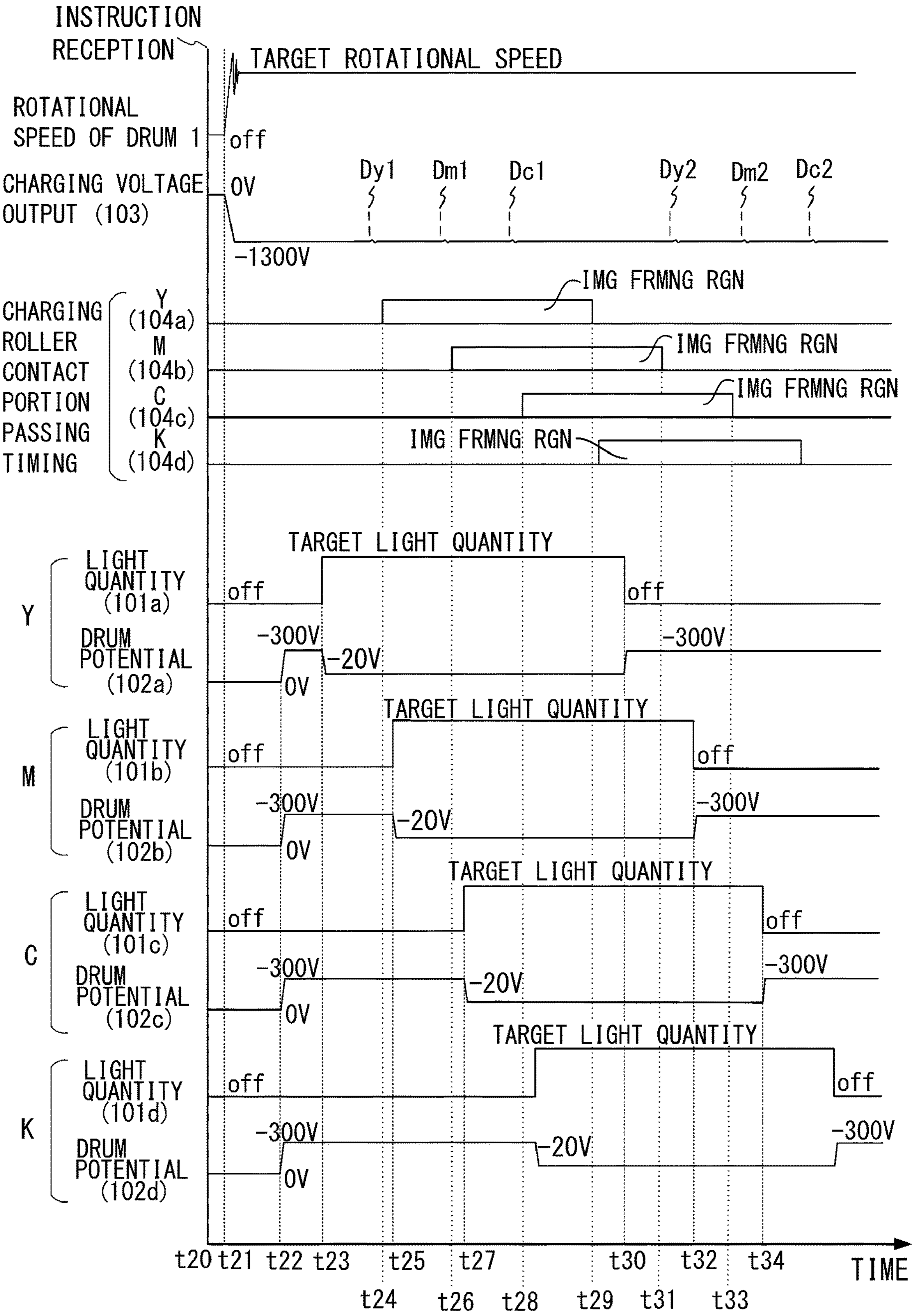

FIG. 10 is a schematic view for illustrating a light emission/light-out timing of the pre-charging exposure device in the embodiment 2.

Figure 11:
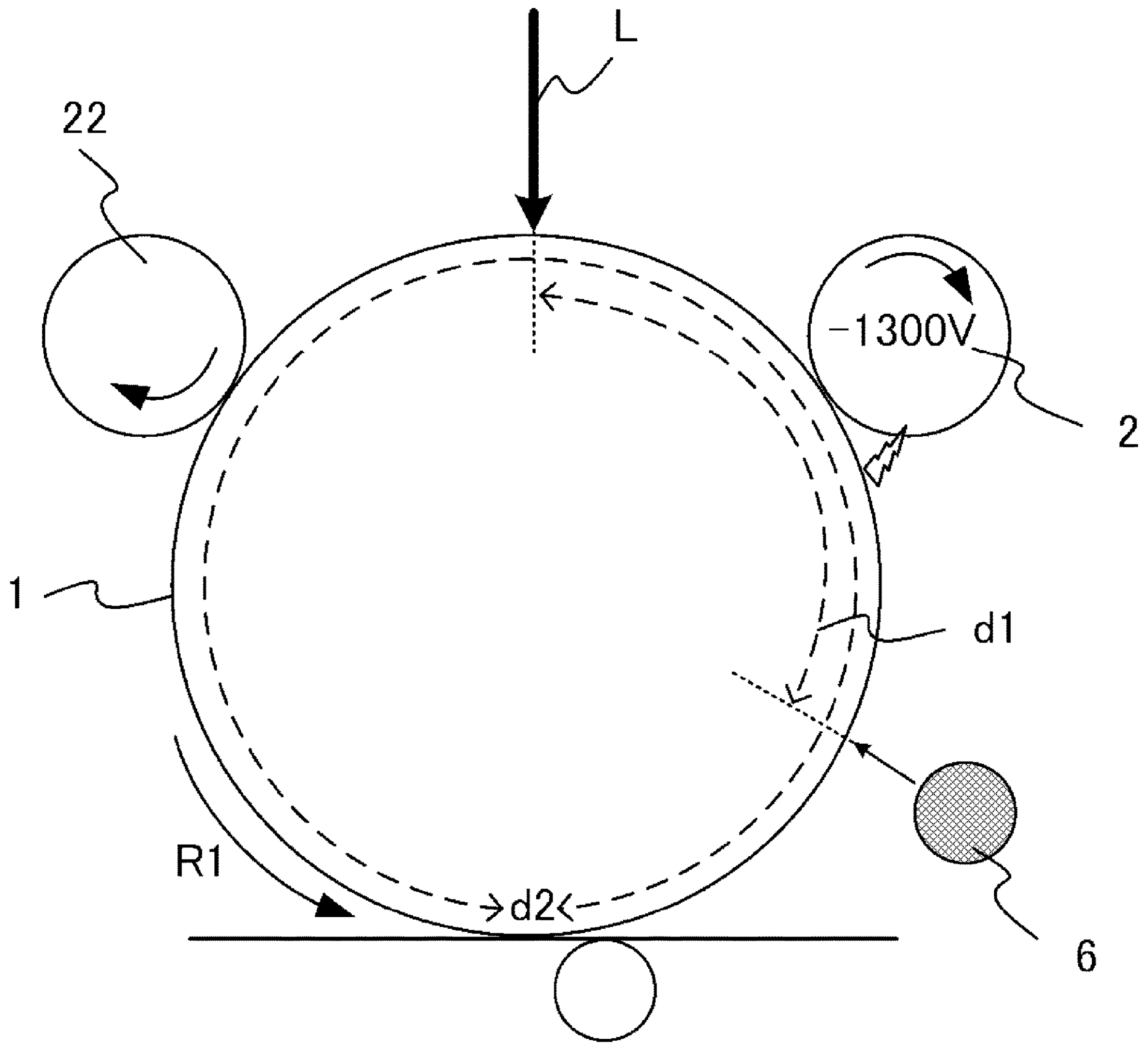

FIG. 11 is a sectional view for illustrating a structure of a photosensitive drum and a periphery thereof in the embodiment 2.

Figure 12:
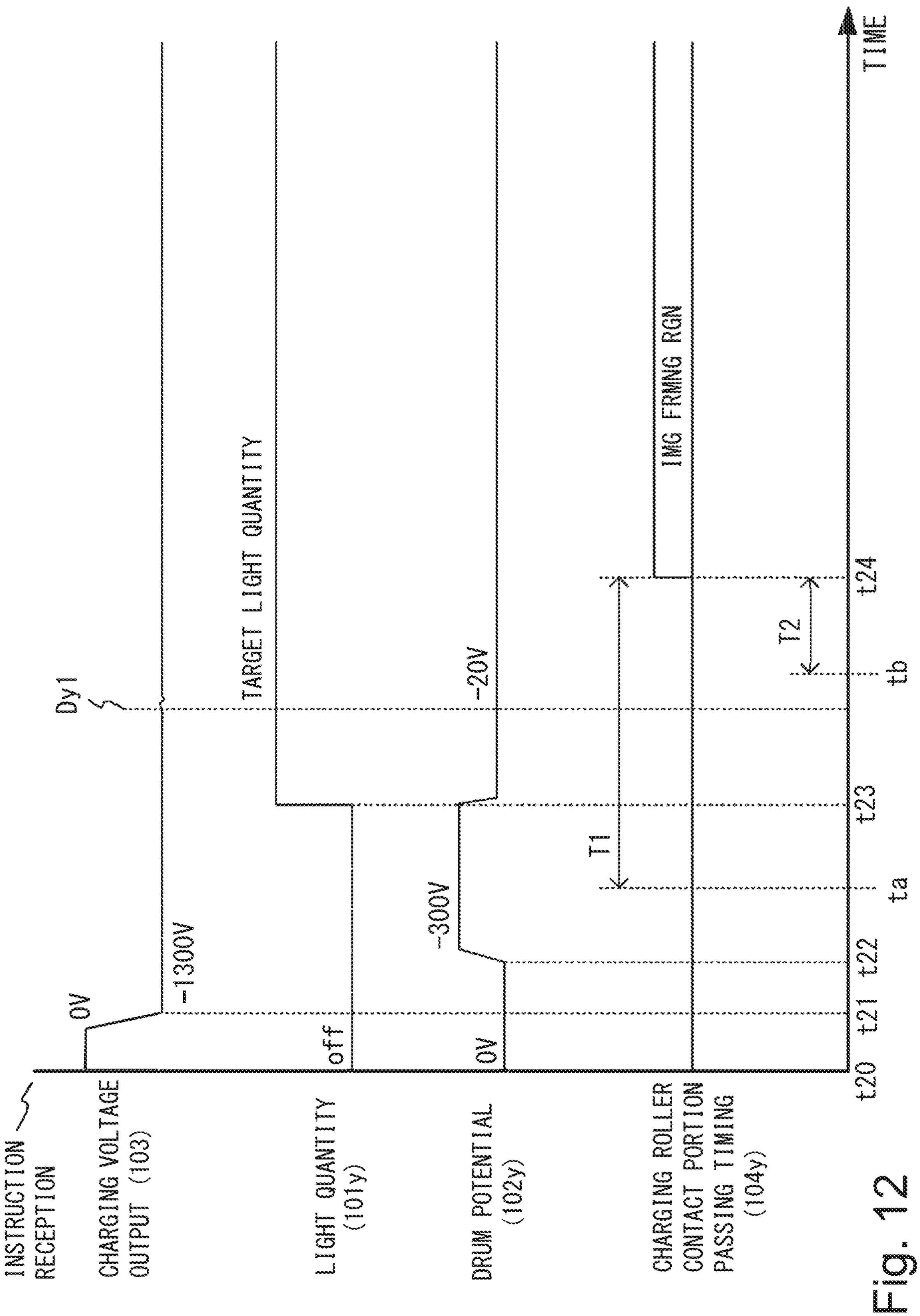

FIG. 12 is a schematic view for illustrating a light emission/light-out timing of the pre-charging exposure device in the embodiment 2.

Figure 13:
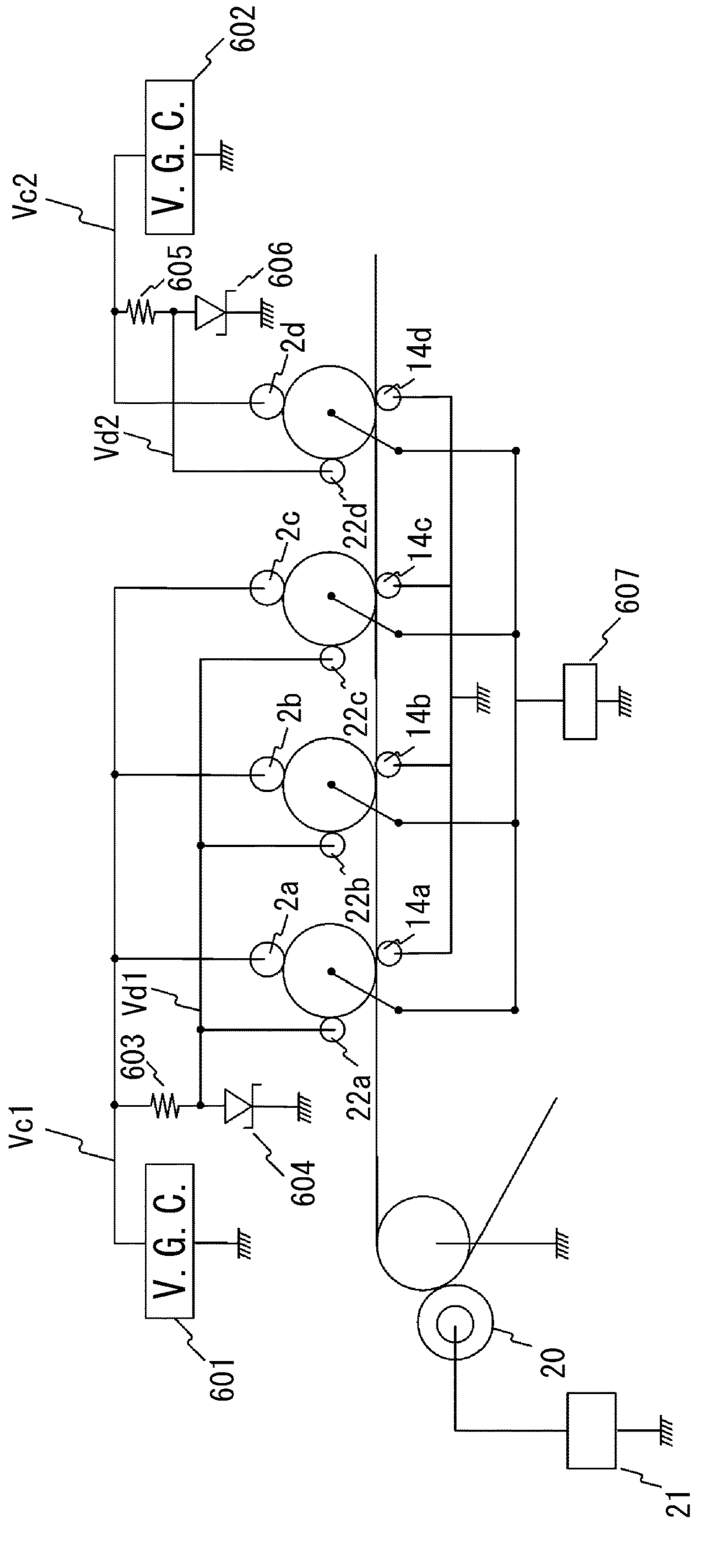

FIG. 13 is a schematic view showing a constitution of a high-voltage generating circuit of the image forming apparatus of the embodiment 3.

DESCRIPTION OF THE EMBODIMENTS

In the following, embodiments of the present invention will be specifically described with reference to the drawings.

[Image Forming Apparatus]

First, a general structure of an image forming apparatus of an electrophotographic type to which the present invention is applied will be described.

Figure 1:
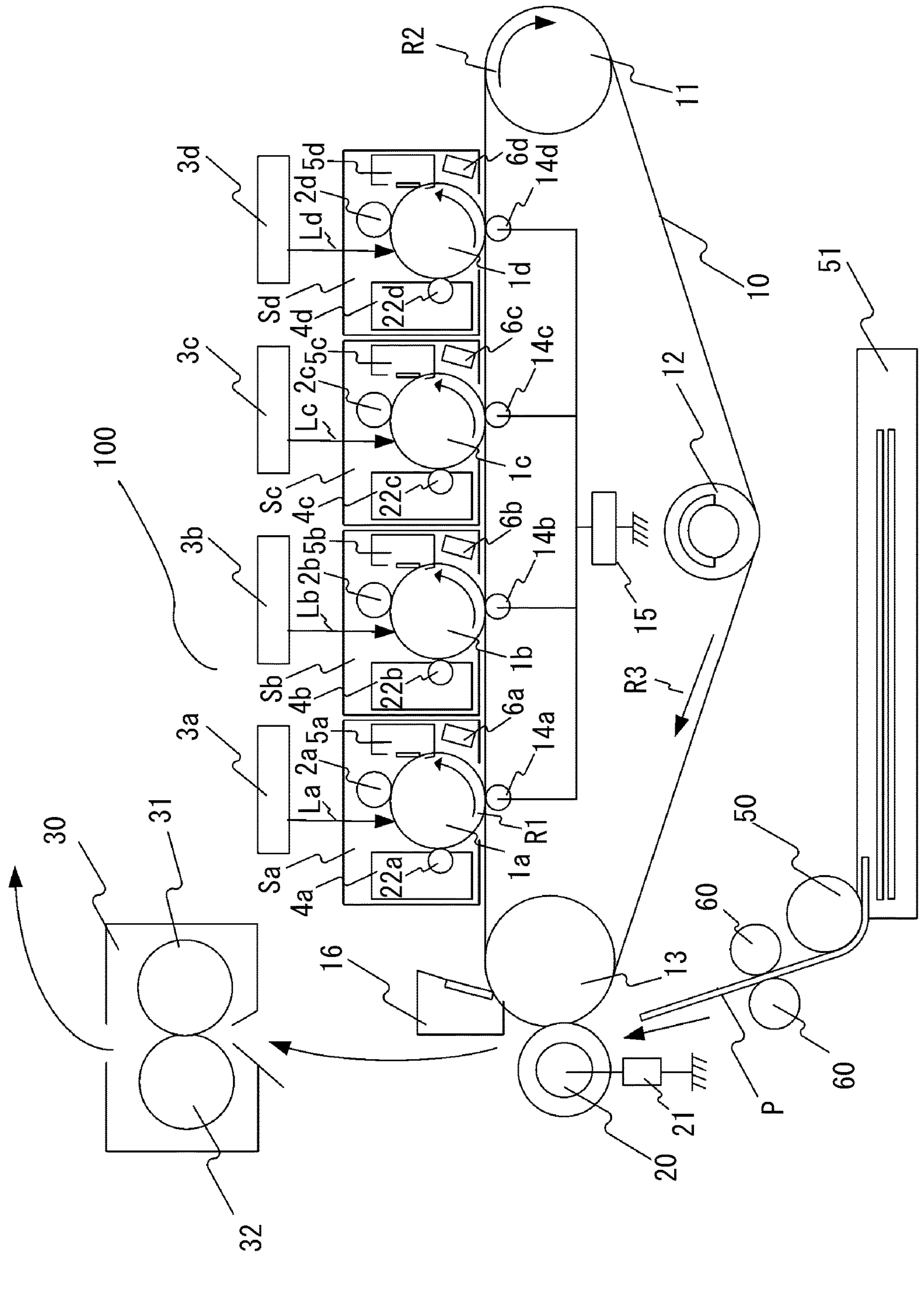
FIG. 1 is a sectional view showing a schematic constitution of an image forming apparatus according to embodiments 1 to 3.

FIG. 1 is a schematic sectional view showing a structure of an image forming apparatus 100 of an embodiment 1. The image forming apparatus 100 is a full-color laser beam printer having a constitution in which process cartridges for forming toner images of colors are provided in parallel and an intermediary transfer belt onto which the toner image formed on photosensitive drums of the process cartridges are transferred. The image forming apparatus is capable of printing a full-color image on a recording material such as a recording sheet, a plastic sheet, or the like on the basis of image information. The image information is inputted, to the image forming apparatus 100, from an image reading apparatus or a host computer such as a personal computer connected to the image forming apparatus 100. The image forming apparatus 100 includes, as image forming portions, process cartridges Sa, Sb, Sc, and Sd for forming toner images of colors of yellow (Y), magenta (M), cyan (C), and black (K), respectively. In this embodiment, the process cartridges Sa, Sb, Sc, and Sd are disposed in line in the horizontal direction crossing a vertical direction as shown in FIG. 1. Incidentally, in this embodiment, constitutions and operations of the process cartridges Sa, Sb, Sc, and Sd are substantially the same except that colors of the toner images to be formed are different from each other. For that reason, in the following, except for the case where the members for a specific process cartridge are described, suffixes, a, b, c, and d which are added to the ends of the reference symbols and which show members of the process cartridges for yellow (Y), magenta (M), cyan (C) and black (K), respectively, will be omitted from description.

In the image forming apparatus 100, each of the process cartridges Sa, Sb, Sc, and Sk includes a photosensitive drum 1 which is an image bearing member. The photosensitive drum 1 is rotationally driven in an arrow direction (counterclockwise direction) in FIG. 1 by a driving source (not shown) which is a driving means. At a periphery of the photosensitive drum 1, a scanner unit 3, a developing unit 4, and a cleaning device 5 for cleaning a surface of the photosensitive drum 1 are provided. The charging roller 2 which is a charging member electrically charges the surface of the photosensitive drum 1 to a uniform potential. Further, the scanner unit 3 which is an exposure portion irradiates the photosensitive drum 1 with laser light L depending on an image signal based on the image information inputted from the above-described host computer, so that an electrostatic latent image is formed on the photosensitive drum 1.

The developing unit 4, which is a developing portion, develops the electrostatic latent image formed on the photosensitive drum 1 by depositing a developer (toner) on the electrostatic latent image, so that the toner image is formed. A predetermined developing voltage is applied to a developing roller 22 in the developing unit 4, and the toner on the developing roller 22 is moved to the electrostatic latent image formed on the photosensitive drum 1 by a potential difference between the potential (voltage) of the developing roller 22 and a surface potential of the photosensitive drum 1, so that development is carried out. The cleaning device 5, which is a cleaning means, removes toner (transfer residual toner) remaining on the surface of the photosensitive drum 1 after primary transfer (described later).

The photosensitive drum 1 is connected to the ground (0 V) (also referred to as grounding), and the electrostatic latent image is formed on the photosensitive drum 1 with respect to a ground potential (0 V). In this embodiment, a voltage applied to the charging roller 2 (hereinafter, reformed to as a charging voltage) is −1300 V, and the surface potential of the photosensitive drum 1 after being charged by the charging roller 2 becomes about −700 V. Further, the surface potential of the photosensitive drum 1 after exposure thereof irradiated with the laser light L from the scanner unit 3 becomes about −70 V, and a developing voltage applied to the developing roller 22 is set at about −330 V, so that the toner is deposited on the electrostatic latent image and thus the development is carried out. The photosensitive drum 1, the charging roller 2, the developing unit 4, and the cleaning device 5 are integrally assembled in a unit and constitute the process cartridge S. The process cartridge S is detachably mountable to the image forming apparatus 100.

Further, an intermediary transfer belt 10 which is a toner image receiving member for transferring the toner images from the photosensitive drums 1 onto the recording material P (described later) is provided opposed to the photosensitive drums 1 of the process cartridges S. The intermediary transfer belt 10 is an endless belt and is circulated and moved (rotated) in an arrow direction (clockwise direction) indicated by R3 in FIG. 1 in contact with the photosensitive drums 1. The intermediary transfer belt 10 is extended around a driving roller 11 rotated in an arrow direction (clockwise direction) indicated by R2 in FIG. 1, a stretching roller 12, and a secondary transfer opposite roller 13.

As shown in FIG. 1, on an inner peripheral surface side of the intermediary transfer belt 10, primary transfer rollers 14 which are primary transfer means are juxtaposed so as to oppose the photosensitive drums 1. Each of the primary transfer rollers 14 presses the intermediary transfer belt 10 toward the associated photosensitive drum 1, and forms a primary transfer portion where the intermediary transfer belt 10 and the photosensitive drum 1 are in contact with each other. To the primary transfer rollers 14, from a primary transfer power source 15 which is a high-voltage power source as a primary transfer voltage applying means, a primary transfer voltage of an opposite polarity to a normal charge polarity of the toner (+100 V in this embodiment) is applied. By this, the toner images formed on the photosensitive drums 1 are successively transferred onto the intermediary transfer belt 10. During full-color image formation, the toner images formed on the photosensitive drums 1 of the process cartridges Sa, Sb, Sc, and Sd are successively superposed on the intermediary transfer belt 10.

The primary transfer roller 14 is a cylindrical metal roller of 6 mm in diameter, and nickel-plated SUS is used. The primary transfer roller 14 is disposed in a position offset from a center position of the photosensitive drum 1 by 8 mm on a side downstream of the photosensitive drum 1 with respect to a movement direction of the intermediary transfer belt 10.

The primary transfer roller 14 presses the intermediary transfer belt 10 toward the photosensitive drum 1 so that the intermediary transfer belt 10 is wound about the photosensitive drum 1. The primary transfer roller 14 is disposed in a position raised by 1 mm from a horizontal surface formed by the photosensitive drums 1 and the intermediary transfer belt 10 so that a winding amount of the intermediary transfer belt 10 about the photosensitive drum 1 can be ensured, and presses the intermediary transfer belt 10 by a force of about 200 gf. Further, the primary transfer roller 14 is rotated with rotation of the intermediary transfer belt 10.

The surface potential of the photosensitive drum 1 is displaced as follows in a primary transfer step from the uniform charging thereof by the charging roller 2 until the toner image is transferred onto the intermediary transfer belt 10 by the primary transfer roller 14. That is, the surface potential of the photosensitive drum 1 is displaced from about −70 V to about −50 V at an exposure irradiation portion where the photosensitive drum surface is irradiated with the laser light L by the scanner unit 3, and is displaced from about −700 V to about −300 Vat a non-exposure portion where the photosensitive drum surface is not irradiated with the laser light L. Then, in order to smooth the surface potential by discharging surface electric charges of the photosensitive drum 1 after the toner image is transferred onto the intermediary transfer belt 10, the surface of the photosensitive drum 1 is discharged by performing pre-charging exposure by a pre-charging exposure device 6 which is a discharging portion. By the pre-charging exposure of the photosensitive drum surface by the pre-charging exposure device 6, the surface potential of the photosensitive drum 1 is reduced (discharged) to a predetermined potential (about −20 V in this embodiment). The discharge of the photosensitive drum surface by the pre-charging exposure device 6 is performed for suppressing an image defect caused by non-uniformity of the surface potential of the photosensitive drum 1 after the primary transfer (hereinafter, this image defect is referred to as a drum ghost). In order to suppress generation of the drum ghost, in the discharge by the pre-charging exposure device 6, the surface potential of the photosensitive drum 1 after the discharge may preferably be made less than a potential (less than −70 V in this embodiment) after the photosensitive drum surface is irradiated with the laser light L by the scanner unit 3.

As shown in FIG. 1, the image forming apparatus 100 includes a cassette 51 in which the recording material P which is recording medium is accommodated. In synchronism with the image forming operation by the above-described process cartridge S, the recording material P accommodated in the cassette 51 is fed to a feeding passage by a paper feeding roller 50, and a registration roller pair 60 provided along the feeding passage conveys the recording material P to a secondary transfer roller 20.

In a position opposing the secondary transfer opposite roller 13 via the intermediary transfer belt 10, the secondary transfer roller 20 which is a secondary transfer means is disposed. The secondary transfer roller 20 press-contacts the intermediary transfer belt 10 toward the secondary transfer opposite roller 13, and forms a secondary transfer portion where the intermediary transfer belt 10 and the secondary transfer roller 20 are in contact with each other. To the secondary transfer roller 20, a secondary transfer voltage of an opposite polarity to a normal charge polarity of the toner is applied from a secondary transfer power source 21 which is a high-voltage power source as a secondary transfer voltage applying means. By this, the toner image formed on the intermediary transfer belt 10 is transferred onto the recording material P.

The secondary transfer roller 20 contacts the intermediary transfer belt by a pressing force of 50N and is rotated by the intermediary transfer belt 10 while forming a secondary transfer nip which is a secondary transfer portion between itself and the intermediary transfer belt 10, and the recording material P is nipped and conveyed to the secondary transfer nip. As the secondary transfer roller 20, a roller of 18 mm in outer diameter which is prepared by coating a nickel-plated steel rod of 8 mm in outer diameter with a 5 mm-thick foam sponge member which is adjusted to have a volume resistivity of $10^8\Omega$ principally comprising NBR and epichlorohydrin rubber is used. Incidentally, a secondary transfer power source 21 in this embodiment is capable of outputting a voltage in a range from 100 V to 5000 V.

To the secondary transfer opposite roller 13, a cleaning blade 16 is contacted via the intermediary transfer belt 10, and removes secondary transfer residual toner remaining on the intermediary transfer belt 10 without being transferred onto the recording material P in the secondary transfer nip. As the cleaning blade 16 in this embodiment, a polyurethane rubber is used, and the cleaning blade 16 is contacted to the secondary transfer opposite roller 13 with a contact pressure of 85.0 gf/cm via the intermediary transfer belt 10.

The recording material P on which the toner images are transferred in the secondary transfer portion is conveyed to a fixing device 30. The fixing device 30 includes a fixing roller 31 and a pressing roller 32, and the recording material P is conveyed to a fixing nip formed by the fixing roller 31 and the pressing roller 32. Then, the recording material P is heated and pressed in the fixing nip, so that the toner transferred on the recording material P is melted and color-mixed on the recording material P, and thereafter, the recording material P on which the toner is fixed is discharged from the image forming apparatus 100.

As the fixing roller 31 which is a fixing member, a roller of 18 mm in outer diameter prepared by forming an elastic layer of an insulating silicone rubber on a metal bare tube and coating an outer peripheral surface of the formed elastic layer with an insulating PFA tube is used, and incorporates a halogen heater (not shown) which is a heating means. The halogen heater is in non-contact with the fixing roller 31 and generates heat by being supplied with electric power from a power source (not shown). As the pressing roller 32 which is a pressing member, a roller of 18 mm in outer diameter prepared by forming an elastic layer of an electroconductive silicone rubber on a core metal and coating an outer peripheral surface of the formed elastic layer with an electroconductive PFA tube is used. The fixing roller 31 and the pressing roller 32 are pressed by 10 kg and thus form a fixing nip. The pressing roller 32 is rotationally driven by a motor (not shown), and the fixing roller 31 is rotated in synchronism with the rotational drive of the pressing roller 32, so that the recording material P conveyed to the fixing nip is nipped and conveyed. The pressing roller 32 is connected from the core metal to the ground (0 V) via a resistor element of 1000 MΩ. Electric charges on the fixing roller 31 and the pressing roller 32 are released to the ground via the resistor element, so that the surfaces of the fixing roller 31 and the pressing roller 32 are prevented from being charged.

Incidentally, the image forming apparatus 100 is capable of forming a single-color image or a color image by using a desired single process cartridge S or a part of the four process cartridges S. The image forming apparatus 100 is a color printer operated with a process speed of 148 mm/sec and meeting A4-size paper.

[Controller of Image Forming Apparatus]

Figure 2:
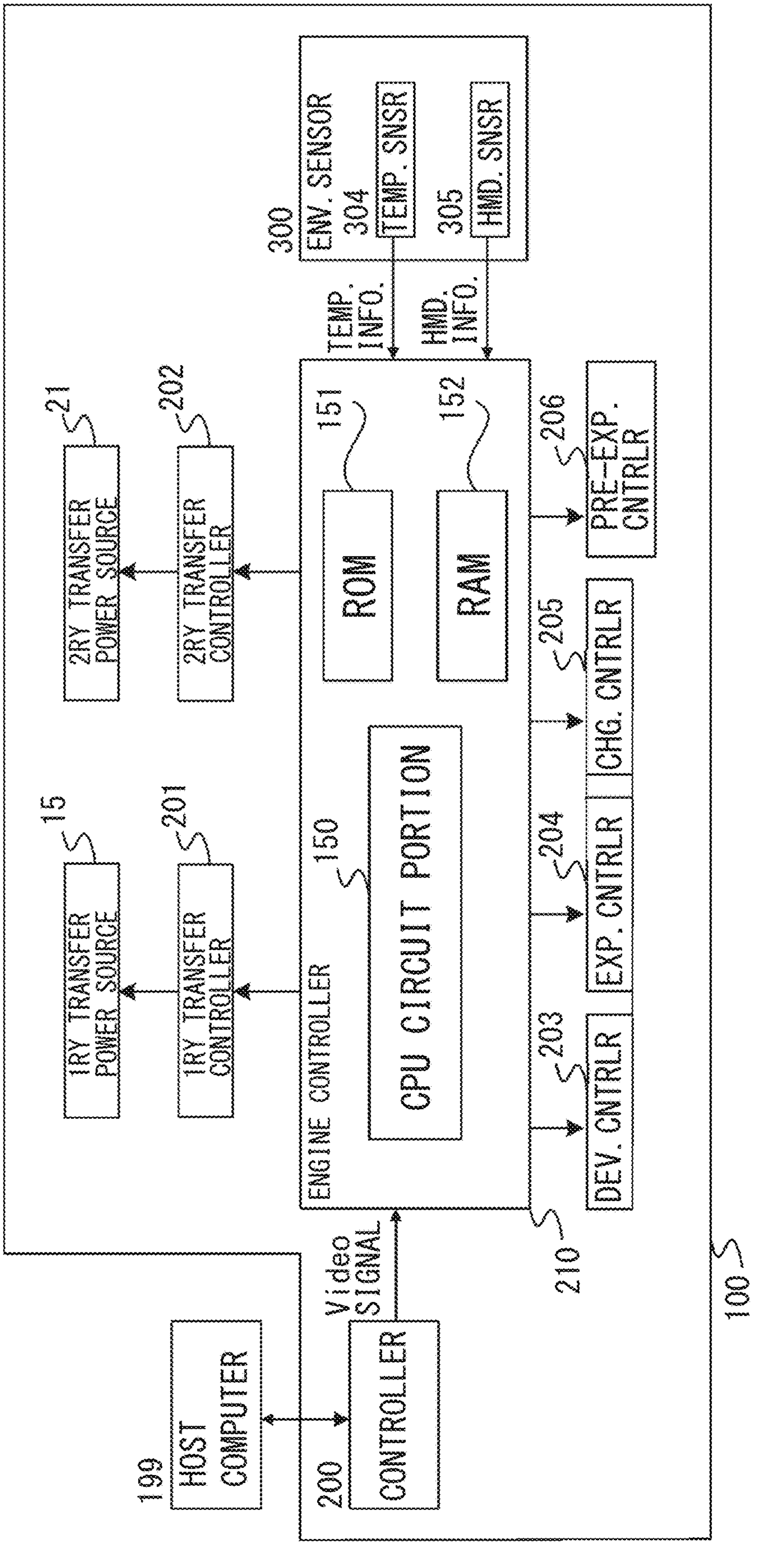
FIG. 2 is a block diagram for illustrating a constitution of a controller of the image forming apparatus of the embodiments 1 to 3.

FIG. 2 is a block diagram for illustrating a constitution of a controller of the image forming apparatus 100 shown in FIG. 1.

In FIG. 2, an engine controller 210, which is a control means, controls the entirety of the image forming apparatus 100. The engine controller 210 includes a CPU circuit portion 150, a ROM 151, and a RAM 152 as shown in FIG. 2. The CPU circuit portion 150 integrally controls a primary transfer controller 201, a secondary transfer controller 202, a development controller 203, an exposure controller 204, a charge controller 205, and a pre-charging exposure controller 206 depending on a control program stored in the ROM 151, which is a storing portion. Incidentally, data such as an environmental table and paper width/paper thickness correspondence table and the like data are stored in the ROM 151, and are acquired by the CPU controller 150 as desired. Further, the RAM 152, which is a storing portion, temporarily holds control data and is used as an operation (working) area of arithmetic processing with control. Further, the image forming apparatus 100 includes an environment sensor 300 including a temperature sensor 304 and a humidity sensor 305 in order to detect environment data in an environment in which the image forming apparatus 100 is installed. Then, the engine controller 210 selects the data of the environment table on the basis of temperature information acquired from the temperature sensor 304 and humidity information acquired from the humidity sensor 305.

When the controller 200 receives a print job including a print instruction and print information which are sent from a host computer 199 which is an external computer, the controller 200 not only sends the print job to the engine controller but also outputs a video signal on the basis of the print information. When the engine controller 210 receives the print job from the controller 200, the engine controller 210 executes an image forming operation by controlling the primary transfer controller 201, the secondary transfer controller 202, the development controller 203, the exposure controller 204, the charging controller 205, and the pre-charging exposure controller 206.

The primary transfer controller 201 controls application of a primary transfer voltage from a primary transfer power source 15 to the primary transfer roller 14. The secondary transfer controller 202 controls application of a secondary transfer voltage from a secondary transfer power source 21 to the secondary transfer roller 20. The development controller 203 controls application of a predetermined developing voltage to the developing roller 22 of the developing unit 4. The exposure controller 204 controls the scanner unit 3 and irradiates the photosensitive drum 1 with the laser light L depending on the video signal on the basis of the image information inputted from the host computer 199, so that the electrostatic latent image is formed on the photosensitive drum 1.

The charge controller 205 controls a charging voltage applied to the charging roller 2. The pre-charging exposure controller 206 controls the pre-charging exposure by the pre-charging exposure device 6.

[Pre-Charging Exposure Device]

Next, the constitution of the pre-charging exposure device 6 will be described.

Figure 3:
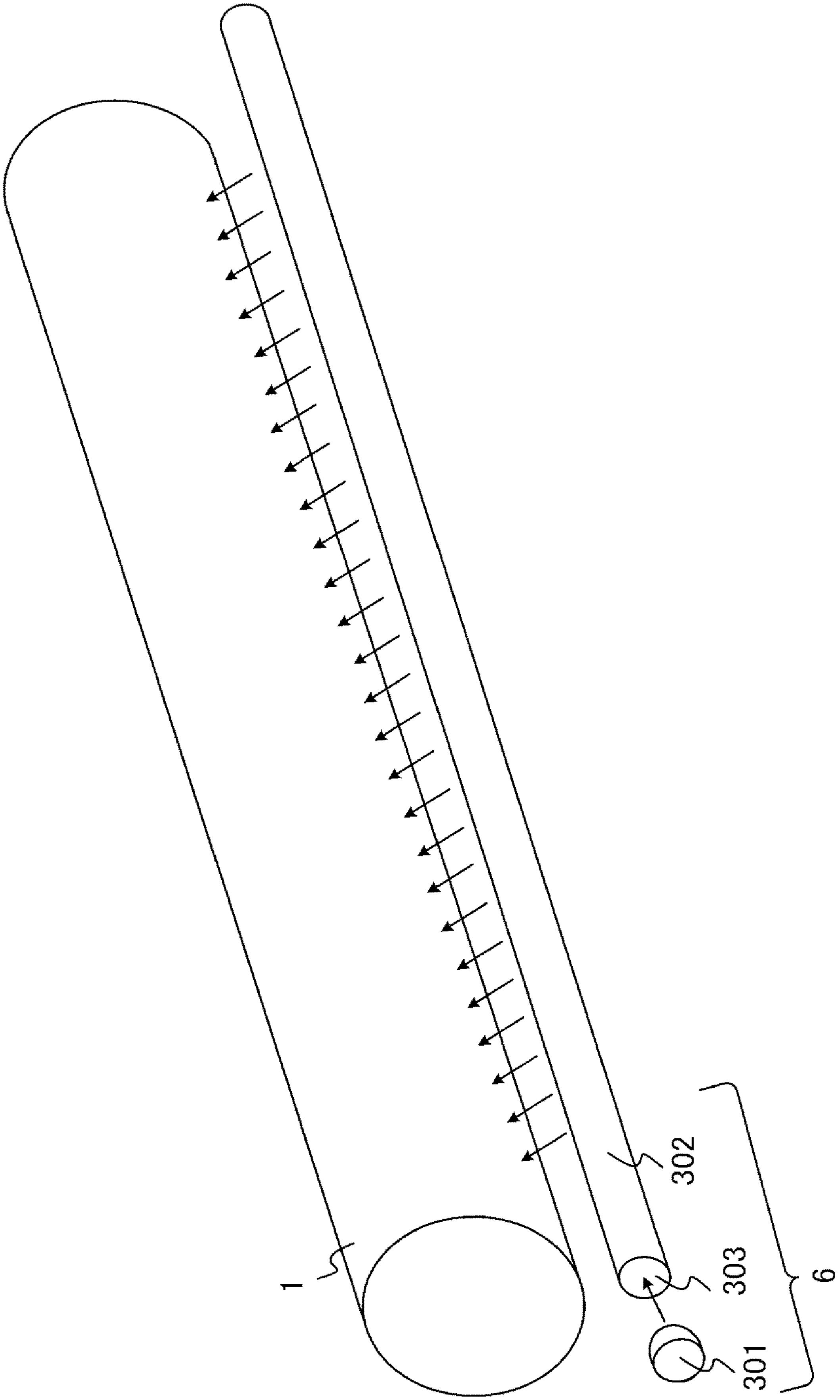
FIG. 3 is a perspective view showing a schematic constitution of a pre-charging exposure device in the embodiments 1 to 3.

FIG. 3 is a perspective view for illustrating the constitution of the pre-charging exposure device 6 for performing the pre-charging exposure of the photosensitive drum 1. As shown in FIG. 3, the pre-charging exposure device 6 is constituted by a light emitting element (device) 301 and a light guide 302. The light emitting element 301 is a light emitting element used for the pre-charging exposure and is provided on a main assembly side of the image forming apparatus 100. On the other hand, the light guide 302 is a light guiding member for irradiating the photosensitive drum 1 with light emitted from the light emitting element 301, and is provided in a cartridge tray (not shown) for holding the process cartridge S. As shown in FIG. 1, in each process cartridge S, the light guide 302 is disposed on a side downstream of the primary transfer roller 14 and upstream of the charging roller 2 with respect to the rotational direction (counterclockwise direction) of the photosensitive drum 1. That is, the pre-charging exposure device 6 has a constitution in which the pre-charging exposure device 6 exposes the surface of the photosensitive drum 1 to light on a side downstream of a transfer portion which is a contact portion between the photosensitive drum 1 and the intermediary transfer belt and upstream of a charging portion which is a contact portion between the photosensitive drum 1 and the charging roller 2.

As shown in FIG. 3, the light guide 302 is disposed substantially parallel to an axial direction (rotational axis direction) of the photosensitive drum 1, and at one end of the light guide 302 with respect to a longitudinal direction, a light incident portion 303 for receiving the light emitted from the light emitting element 301 is provided. The light emitting element 301*y* is subjected to control of an emitted light quantity at a predetermined timing by a pre-charging exposure controller (see FIG. 4) (described later). Light emitted from the light emitting element 301 and incident on the light guide 302 is diffused as diffused light, and the photosensitive drum 1 is irradiated with the diffused light from a side surface of the light guide 302, so that the surface potential of the photosensitive drum 1 is removed.

In this embodiment, the emitted light quantity of the pre-charging exposure device 6 is adjusted so as to become a predetermined light quantity set in advance. For example, in the neighborhood of the light emitting element 301, the light guide 302, and the photosensitive drum 1, a light receiving element (device) for detecting the emitted light quantity of the pre-charging exposure device 6 is provided, and a mechanism for adjusting the emitted light quantity depending on deterioration of the light emitting element 301, contamination of the light guide 302, and a change in received light sensitivity may be provided. Further, in this embodiment (embodiment 1), a constitution in which the light guide 302 is provided in the cartridge tray (not shown) was described. For example, a constitution in which the light guide 302 is provided in the process cartridge S, a constitution in which an LED array is used instead of the light guide 302, and a constitution in which the light guide 302 is not used for further simplifying the apparatus and in which the photosensitive drum 1 is directly irradiated with the light may be employed.

[Control Circuit of Pre-Charging Exposure Device]

Next, a circuit for controlling the emitted light quantity of the light emitting element 301 of the pre-charging exposure device 6 will be described.

Figure 4:
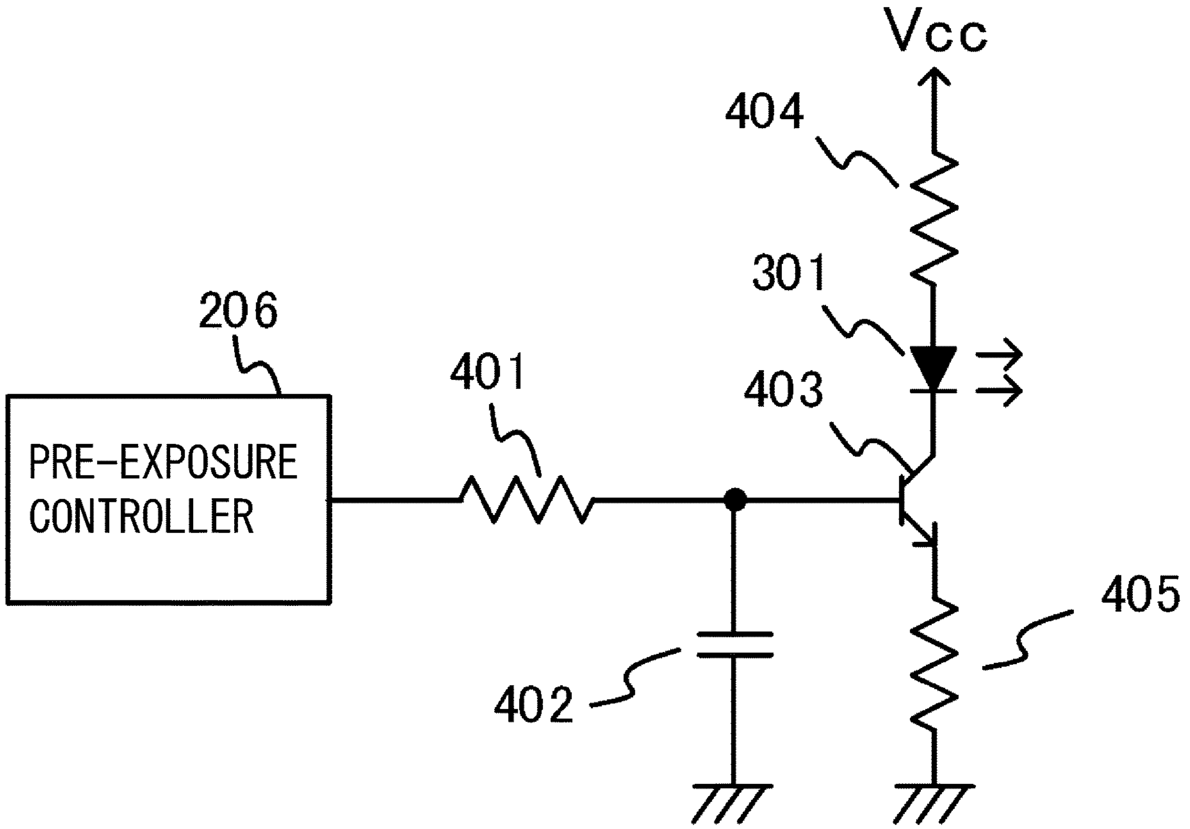
FIG. 4 is a circuit diagram showing a circuit constitution of a light emission control circuit of the pre-charging exposure device in the embodiments 1 to 3.

FIG. 4 is a circuit diagram showing a circuit constitution of a light emission control circuit of the light emitting element 301 of the pre-charging exposure device 6. The light emission control circuit controls the light emitting element 301*y* and includes light emitting diode resistors 401, 404 and 405, a capacitor 402, and a transistor 403. To the light emission control circuit, a PWM signal for controlling the emitted light quantity of the light emitting element 301 is inputted from the pre-charging exposure controller 206 (FIG. 2). The PWM signal is smoothed by an RC filter constituted by the resistor 401 and the capacitor 402 and is inputted to a base terminal of the transistor 403. A constitution in which a voltage inputted to the base terminal of the transistor 403 is capable of being adjusted depending on an OnDuty (duty) of the PWM signal inputted from the pre-charging exposure controller 206 is described.

To a collector terminal of the transistor 403, a cathode terminal of the light emitting diode 301 is connected, and an anode terminal of the light emitting diode 301 is connected to one end of the resistor 404. The other end of the resistor 404 is connected to a power source voltage Vcc. On the other hand, an emitter terminal of the transistor 403 is connected to the ground via the resistor 405. On the basis of a base terminal voltage of the transistor 403, a voltage dropped by a voltage between the base and the emitter is applied to the resistor 404. By this, a current flowing through the light emitting element (light emitting diode) 301 is controlled, so that the light quantity of the light with which the photosensitive drum 1 is irradiated is changed depending on a current value of the current flowing through the light emitting element (light emitting diode) 301.

Parts (a) and (b) of FIG. 5 are graphs showing a base voltage relationship between an OnDuty (on state ratio in one cyclic period) of the PWM signal outputted from the pre-charging exposure controller 206 and a base voltage inputted to a base terminal of the transistor 403, and a relationship between the OnDuty of the PWM signal and a control current flowing through the light emitting element 301, respectively. Part (a) of FIG. 5 is the graph showing a relationship between the OnDuty of the PWM signal and the base voltage of the transistor 403. In part (a) of FIG. 5, the abscissa represents the OnDuty (unit: %), and the ordinate represents the base voltage (unit: V) of the transistor 403. As shown in part (a) of FIG. 5, when the OnDuty of the PWM signal is 20%, the voltage of the base terminal of the transistor 403 is 0.7 V and thus is a voltage at which the transistor 403 is turned on. Further, when the OnDuty of the PWM signal is 100%, the voltage of the base terminal of the transistor 403 is 3.3 V.

Part (b) of FIG. 5 is the graph showing a relationship between the OnDuty of the PWM signal and the control current ratio of the current flowing through the light emitting element 301. In part (b) of FIG. 5, the abscissa represents the OnDuty (unit: %) of the PWM signal, and the ordinate represents the control current ratio (unit: %) of the current flowing through the light emitting element 301. The control current ratio shows a ratio of the current flowing through the light emitting element 301 when the current flowing through the light emitting element 301 when the OnDuty of the PWM signal is 100% is taken as 100%. Part (b) of FIG. 5 shows that the transistor 403 is in an ON state from the neighborhood of the OnDuty of the PWM signal exceeding about 20% and thus the current starts to flow through the light emitting element 301 and that the light emission control of the light emitting element 301 of the pre-charging exposure device 6 is capable of being carried out from a small light quantity region.

In this embodiment, a method in which via the RC filter constituted by the resistor 401 and the capacitor 402, the base voltage of the transistor 403 is controlled and the current flowing through the light emitting element 301 is controlled, and thus the emitted light quantity of the light emitted by the light emitting element 301 is adjusted was described. In this embodiment, the emitted light quantity was adjusted by controlling the current flowing through the light emitting element 301, but for example, a method in which the discharge amount of the surface electric charge of the photosensitive drum 1 is adjusted by causing the light emitting element 301 to emit light pulses may be employed.

[High-Voltage Power Source]

Next, a constitution of the high-voltage power source of the image forming apparatus 100 of this embodiment will be described. FIG. 6 is a schematic sectional view for illustrating the constitution of the high-voltage power source for supplying a high voltage to the process cartridges Sa to Sd, and like for forming the images. In FIG. 6, how to supply voltages from which high-voltage power source to the charging roller 2, the developing roller 22, the primary transfer roller 14, and the secondary transfer roller 20 of each process cartridge is schematically shown.

In FIG. 6, a voltage generating circuit 601 which is a first power source generates a charging voltage Vc1 and supplies the charging voltage Vc1 to the charging rollers 2*a*, 2*b*, and 2*c* of the process cartridges Sa, Sb, and Sc for yellow (Y), magenta (M) and cyan (C) of the toner colors. In this embodiment, in order to downsize the power source downstream, to the charging rollers 2 which are charging members of the plurality of process cartridges S, the charging voltage Vc1 is supplied from a common voltage generating circuit 601.

Further, a voltage dividing circuit constituted by the resistor 603 and the Zener diode 604 generates a developing voltage Vd1 by dividing the charging voltage Vc1. In the voltage dividing circuit, one end of the resistor 603 is connected to a terminal of the voltage generating circuit for outputting the charging voltage Vc1. Further, another terminal of the resistor 603 is connected to an anode terminal of the Zener diode 604 and the developing rollers 22*a*, 22*b*, and 22*c* of the process cartridges Sa, Sb, and Sc. A cathode terminal of the Zener diode 604 is connected to the ground.

The developing voltage Vd1 generated by the voltage dividing circuit is supplied to the developing rollers 22*a*, 22*b*, and 22*c* of the process cartridges Sa, Sb, and Sc. In this embodiment, the charging voltage Vc1 supplied to the charging rollers 2*a*, 2*b*, and 2*c* is −1300, and the developing voltage Vd1 supplied to the developing rollers 22*a*, 22*b*, and 22*c* is −330 V.

On the other hand, a voltage generating circuit 602 which is a second power source generates a charging voltage Vc2 and supplies the charging voltage Vc2 to the charging roller 2*d* of the process cartridge Sd for black (k) of the toner color. In this embodiment, the charging voltage is independently supplied during printing of a monochromatic image, and therefore, the voltage generating circuit 602 is provided separately from the above-described voltage generating circuit 601. Further, also, in the voltage generating circuit 602, similarly as in the voltage generating circuit 601, a voltage dividing circuit for generating a developing voltage Vd2 by dividing the charging voltage Vc2 is provided. The voltage dividing circuit is constituted by a resistor 605 and Zener diode 606. One end of the resistor 605 is connected to a terminal of the voltage generating circuit 602 for outputting the charging voltage Vc2, and the other end of the resistor 605 is connected to an anode terminal of the Zener diode 606 and the developing roller 22*d* of the process cartridge 225*k*. A cathode terminal of the Zener diode 606 is connected to the ground. The developing voltage Vd2 generated by the voltage dividing circuit is supplied to the developing roller 22*d* of the process cartridge Sd. In this embodiment, a charging voltage Vc2 supplied to the charging roller 2*d* is −1300 V, and a developing voltage Vd2 supplied to the developing roller 22*d* is −330 V.

Each of the voltage generating circuits 601 and 602, which are the power sources, includes a voltage detecting circuit (not shown) capable of variably changing the charging voltage supplied to the associated charging roller(s) 2 depending on a use (operation) environment of the image forming apparatus 100 or with a change with time of the photosensitive drum 1. In this embodiment, the charging voltage Vc1 generated by the voltage generating circuit 601 is applied to the charging rollers 2*a*, 2*b*, and 2*c*, and the charging voltage Vc2 generated by the voltage generating circuit 602 is applied to the charging roller 2*d*, and is used for setting the surface of the photosensitive drum 1 to a uniform potential. On the other hand, the developing voltage Vd1 is applied to the developing rollers 22*a*, 22*b*, and 22*c*, and the developing voltage Vd2 is applied to the developing roller 22*d*, and these voltages are used for depositing the toners on the electrostatic latent images formed on the photosensitive drums 1.

The primary transfer power source 15 generates a primary transfer voltage and applies the primary transfer voltage to the primary transfer rollers 14*a*, 14*b*, 14*c*, and 14*d*, and the primary transfer voltage is used for transferring the toner images from the photosensitive drums 1 onto the intermediary transfer belt 10. Further, the secondary transfer power source 21 generates a secondary transfer voltage and applies the secondary transfer voltage to the secondary transfer roller 20, and the secondary transfer voltage is used for transferring the toner images from the intermediary transfer belt 10 onto the recording material P.

[Light Emission/Light-Out Timing of Pre-Charging Exposure Device]

FIG. 7 is a timing chart showing states of the pre-charging exposure devices 6, the photosensitive drum 1, the charging voltage, and the like during the printing operation of the image forming apparatus 100 of this embodiment. In FIG. 7, the abscissa represents a time, and t0 to t8 show timings (times). On the other hand, in the ordinate of FIG. 7, the "rotational speed of photosensitive drum" shows a state in which the rotational speed is changed from a state (OFF) in which rotation of the photosensitive drum 1 of each process cartridge S is stopped to a target rotational speed depending on a process speed. The "charging voltage output (103)" shows a voltage state of the charging voltage Vc1 outputted from the above-described voltage generating circuit 601. The "charging roller passing timing of image forming region" shows a timing when each of image forming regions in which images are formed on the photosensitive drums 1 of the process cartridges Sa, Sb, Sc, and Sd passes through the contact portion of the photosensitive drum 1 with the charging roller 2. Incidentally, in FIG. 7, yellow (Y) corresponds the process cartridge Sa, magenta (M) corresponds to the process cartridge Sb, cyan (C) corresponds to the process cartridge Sc, and black (K) corresponds to the process cartridge Sd. The "emitted light quantity of light emitting element" shows a change in light quantity (emitted light quantity) of light emitted from the light emitting element 301 of the pre-charging exposure device 6 corresponding to an associated one of the process cartridges S. The "surface potential of photosensitive drum 1" shows a change in surface potential of the irradiation portion of the photosensitive drum 1 irradiated with the light from the pre-charging exposure device 6 for the photosensitive drum 1 of an associated one of the process cartridges S.

In the following, a light emission timing of the light emitting element 301 of the pre-charging exposure device 6, which is a feature of this embodiment, will be described. At a time t0, the controller 200 sends a print job, to the engine controller 210, when it receives the print job including print information and a printing instruction from the host computer 199. When the engine controller 210 receives the print job from the controller 200, the engine controller starts the image forming operation (printing operation) by controlling the primary transfer controller 201, the secondary transfer controller 202, the development controller 203, the exposure controller 204, the charge controller 205, and the pre-charging exposure controller 206.

When the image forming operation is started, at a time t1, rotational drive of the photosensitive drum 1 is started. Further, at the substantially same timing (time t1) when the rotational drive of the photosensitive drum 1 is started, the charging voltage Vc1 is applied from the voltage generating circuit 601 to the charging rollers 2*a*, 2*b*, and 2*c*. At this time, the charge controller 205 (FIG. 2) starts up an output voltage of the voltage generating circuit 601 by control based on a PID parameter determined in advance so that output of the charging voltage Vc1 from the voltage generating circuit 601 quickly becomes a desired charging voltage of −1300 V.

Rotation of the photosensitive drum 1 requires a certain time until drive of a motor for driving the photosensitive drum 1 is stabilized. For that reason, the rotational speed of the photosensitive drum 1 of each of the process cartridges S falls within an error of a desired rotational speed and is stabilized at a target rotational speed, and thereafter, the image forming operation is started in the order of the process cartridges Sa, Sb, and Sc disposed on an upstream side of a movement direction of the intermediary transfer belt 10.

The surface potential of the photosensitive drum 1 to which application of the charging voltage is started at the time t1 by the charging roller 2 becomes about −300 V at a time t2 when an associated position reaches the irradiation position of the photosensitive drum surface with light by the light emitting element 301 of the pre-charging exposure device 6. Then, the pre-charging exposure device 6*a* turns on the light emitting element 301 at a time t3 and starts discharge in preparation for image formation (start of exposure) in the process cartridge Sa. In FIGS. 7, 101*a* and 102*a* represent the emitted light quantity of the light emitting element 301 of the pre-charging exposure device 6*a* in the process cartridge Sa and the surface potential of the irradiation portion of the photosensitive drum 1 irradiated with the light from the light emitting element 301 of the pre-charging exposure device 6*a*, respectively. In this embodiment, the emitted light quantity of the light emitting element 301 is controlled so as to be changed from the off state (OFF) to a predetermined target light quantity (in this embodiment, a light quantity when OnDuty of the PWM signal outputted from the pre-charging exposure controller 206 is 100%). By this, the surface potential of the irradiation portion of the photosensitive drum 1 irradiated with the light from the light emitting element 301 of the pre-charging exposure device 6 is changed from about −300 V to −20 V, which is a desired potential. Thereafter, when the time becomes a time t4, in the process cartridge Sb, and then when the time becomes a time t5, in the process cartridge Sc, the associated light emitting element 301 is turned on and discharge is started in preparation for image formation (start of exposure).

The charging voltage output (103) shows a progression of output of the charging voltage supplied from the voltage generating circuit 601, which is a common power source for the charging rollers 2*a*, 2*b*, and 2*c* of the process cartridges Sa, Sb, and Sc for the toner colors of yellow, magenta, and cyan, respectively. Further, a timing (time) Dy1 shows a timing when, on the photosensitive drum 1*a* of the process cartridge Sa, the irradiation portion (see, 102*a*) irradiated with the light from the light emitting element 301 of the pre-charging exposure device 6*a* reaches a contact portion thereof with the charging roller 2*a*. Similarly, a timing (time) Dm1 shows a timing when, on the photosensitive drum 1*b* of the process cartridge Sb, the irradiation portion (see, 102*b*) irradiated with the light from the light emitting element 301 of the pre-charging exposure device 6*b* reaches a contact portion thereof with the charging roller 2*b*. Further, a timing (time) Dc1 shows a timing when, on the photosensitive drum 1 of the process cartridge Sb, the irradiation portion (see, 102*c*) irradiated with the light from the light emitting element 301 of the pre-charging exposure device 6*c* reaches a contact portion thereof with the charging roller 2*c*.

As shown in FIG. 7, the surface potential of the photosensitive drum 1 is abruptly displaced from −300 V to −20 V before and after the photosensitive drum surface is irradiated with the light from the light emitting element 301 of the pre-charging exposure device 6. The displacement (potential step) of the surface potential on the photosensitive drum 1 has the influence on the charging voltage output (103). However, in this embodiment, when the surface of the photosensitive drum 1 is irradiated with the light from the light emitting element 301 of the pre-charging exposure device 6, the timing of the turning-on of the light emitting element 301 is shifted for every process cartridge S. For that reason, the timings Dy1, Dm1, and Dc1, each corresponding to when the irradiation portion which is a potential step portion where the surface potential of the photosensitive drum 1 is displaced by light irradiation from the light emitting element 301 is moved to the contact portion where the irradiation portion contacts the charging roller 2 immediately after the displacement, can be shifted for the process cartridges Sa, Sb, and Sc, respectively. As a result, a degree of a fluctuation in output of the voltage of the charging voltage output (103) can be made small, so that a stable charging voltage can be continuously applied to the charging roller 2 of each of the process cartridges S. Incidentally, as shown in FIG. 7, a light emission timing of the light emitting element 301 of the pre-charging exposure device 6 corresponding to the process cartridge Sc is latest in the process cartridges Sa, Sb, and Sc. However, the light emission timing of the light emitting element 301 of the pre-charging exposure device 6 corresponding to the process cartridge Sc is earlier than an image forming timing of the process cartridge Sa earliest in start of the image formation in the process cartridges Sa, Sb, and Sc.

Further, when the light emitting element 301 of the pre-charging exposure device 6 is turned off, the surface potential of the photosensitive drum 1 in the irradiation portion by the pre-charging exposure device 6 is abruptly displaced from −20 V to −300 V before and after a turning-off timing of the light emitting element 301. A displacement (potential step) of the surface potential on the photosensitive drum 1 at a time of this turning-off of the light emitting element 301 has also the influence on the charging voltage output (103). For that reason, in this embodiment, similarly as during the turning-on of the light emitting element 301, also during the turning-off of the light emitting element 301, a light-out (turning-off) timing of the light emitting element 301 of each of the process cartridges S is shifted for every process cartridge S. Specifically, as shown in FIG. 7, the pre-charging exposure device 6*a* corresponding to the process cartridge Sa turns off the light emitting element 301 at a time t6. Similarly, the pre-charging exposure device 6*b* corresponding to the process cartridge Sb turns off the light emitting element 301 at a time t7, and the pre-charging exposure device 6*c* corresponding to the process cartridge Sc turns off the light emitting element 301 at a time t8. By this, timings Dy2, Dm2, and Dc2, each corresponding to when a light-out portion where the surface potential of the photosensitive drum 1 is displaced from −20 V to −300 V by turning-off the light emitting element 301 is moved to a contact portion thereof with the charging roller 2 immediately after the displacement, can be shifted for the process cartridges Sa, Sb, and Sc, respectively. As a result, it is possible to suppress an output fluctuation in charging voltage output at a timing when a surface potential step portion of the photosensitive drum 1 occurs by the turning-off of the light emitting element 301 on the photosensitive drum 1 when the light emitting element 301 of the pre-charging exposure device 6 reaches the contact portion thereof with the charging roller 2. Incidentally, as shown in FIG. 7, after all the image forming operations in the process cartridges Sa, Sb, and Sc are completed, the light emitting elements of the pre-charging exposure devices 6 corresponding to the process cartridges Sa, Sb, and Sc are turned off successively at shifted timings.

Incidentally, as regards the process cartridge Sd of the toner color of black (K), the charging voltage applied to the charging roller 2*d* is supplied from the voltage generating circuit 602, and therefore, in this embodiment, this charging voltage does not have the influence on output of the charging voltages supplied to other process cartridges Sa, Sb, and Sc. As described above, in a constitution in which supply of the charging voltage to the plurality of charging rollers 2 is carried out from a single common power source (voltage generating circuit 601 in this embodiment), the light emission timing of the light emitting element 301 is shifted for every process cartridge. This is a feature of this embodiment.

[Fluctuation in Charging Voltage Due to Difference in Light Emission/Light-Out Timing of Pre-Charging Exposure Device]

Subsequently, an effect of this embodiment will be described by showing a problem in a comparison example with a constitution combined with a light emission timing of a conventional pre-charging exposure device. In the comparison example, control of the pre-charging exposure device 6 is carried out using the constitution of the image forming apparatus 100 of this embodiment described above. FIG. 8 is a timing chart showing states of the pre-charging exposure devices 6, the photosensitive drums 1, the charging voltage, and the like during the printing operation of the image forming apparatus 100 in the comparison example. In FIG. 8, the abscissa represents a time, and t10 to t14 represent timings (times). Further, in FIG. 8, items indicated in the ordinate are similar to those in FIG. 7 described above, so that a manner of understanding of FIG. 8 will be omitted from description.

In the comparison example, compared with this embodiment described above, the light emission/light-out timings of the light emitting elements 301 of the pre-charging exposure devices 6 are different. That is, in this embodiment, in the process cartridges Sa, Sb, and Sc to which the power source for supplying the charging voltage is common, the light emission/light-out timings of the light emitting elements 301 of the pre-charging exposure devices 6 are different from each other. On the other hand, in the comparison example, in the process cartridges Sa, Sb, and Sc to which the process cartridge for supplying the charging voltage is common, the light emission/light-out timings of the light emitting elements 301 of the pre-charging exposure devices 6 are the same (timing). This is different from this embodiment.

As shown in FIG. 8, in the process cartridges Sa, Sb, and Sc, light emission timings when the light emitting elements 301 of the pre-charging exposure devices 6 are turned on are the same time t13. As a result, on the photosensitive drums of the process cartridges Sa, Sb, and Sc, timings D1 when the irradiation portions irradiated with the laser beams from the light emitting elements 301 of the pre-charging exposure devices 6 reach the contact portions thereof with the associated charging rollers 2 are the same (timing). For that reason, load fluctuations due to displacement of the surface potentials of the photosensitive drums 1 caused by discharge by the light emitting elements 301 of the pre-charging exposure devices 6 overlap with each other by the three portions Sa, Sb, and Sc. As a result, as regards the charging voltage shown by the charging voltage output (103), at the timing D1, overshoot generates, and on the surface of the photosensitive drum 1, a potential memory or the like occurs in some cases, so that an image defect, due to the potential memory, such that an image density becomes thin in a lateral stripe shape generates.

On the other hand, in this embodiment, the light emission timings of the light emitting elements 301 of the pre-charging exposure devices 6 in the process cartridges S are shifted from each other so that load fluctuations by discharge do not occur at the same timing while making the surface potentials of the photosensitive drums 1 uniform by the discharge by the pre-charging exposure devices 6. As a result, an abrupt and large load fluctuation does not generate on the photosensitive drum 1, and therefore, the charging voltage output is stabilized, so that it is possible to suppress the occurrence of the image defect due to the overshoot of the charging voltage.

Further, in the comparison example, light-out timings when the light emitting elements 301 of the pre-charging exposure devices 6 are turned off are the same timing t14. Also, when the light emitting elements 301 of the pre-charging exposure devices 6 are turned off, by the turning-off of the light emitting elements 301 of the pre-charging exposure devices 6, the surface potentials of the photosensitive drums 1 are abruptly displaced from −20 V to −300 V. For that reason, an output fluctuation occurs in charging voltage output at a timing D2 when a potential step of the surface potentials of the photosensitive drums 1 by the light emitting elements 301 of the pre-charging exposure devices 6 in the process cartridges Sa, Sb, and Sc reaches a contact portion thereof with the charging roller 6. On the other hand, in this embodiment, also during the turning-off of the light emitting elements 301, the light emission/light-out timings of the light emitting elements 301 in the process cartridges Sa, Sb, and Sc are shifted from each other so that the load fluctuations do not overlap with each other at the same timing. By this, on the photosensitive drums of the process cartridges Sa, Sb, and Sc, an output fluctuation of the charging voltage at a timing when the surface potential step portion of the photosensitive drum 1 by the turning-off of the light emitting element 301 of the pre-charging exposure device 6 reaches the contact portion thereof with the charging roller 2 can be suppressed. Incidentally, as regards the process cartridge Sd for the toner color of black (K) in the comparison example, similarly as in this embodiment, the charging voltage is supplied from the voltage generating circuit 602 to the charging roller 2*d*, and therefore, this charging voltage has no influence on output of the charging voltage to other process cartridges Sa, Sb, and Sc.

In this embodiment, a method of the control in which the light emission/light-out timings of the light emitting elements 301 of the pre-charging exposure devices 6 in the process cartridges were shifted from each other was described. For example, as in the process cartridge Sd, the charging voltage applied to the charging roller 2*d* is supplied from the voltage generating circuit 602 different from the voltage generating circuit 601 for other process cartridges. By this, in the process cartridge Sd, even when the turning-on and turning-off of the light emitting element 301 are performed at the same timing as the timing for either one of other process cartridges Sa, Sb, and Sc, the voltage generating circuit 602 may only be influenced by the load fluctuation of the process cartridge Sd. For that reason, in the process cartridge Sd, it is not necessarily required that the turning-on control and the turning-off control of the light emitting element 301 of the pre-charging exposure device 6 are carried out at timings shifted from those for other process cartridges Sa, Sb, and Sc. Further, in this embodiment, only the turning-on/turning-off control of the light emitting elements 301 of the pre-charging exposure devices 6 in the image forming operation was described, but the turning-on/turning-off control described in this embodiment may also be carried out in the turning-on/turning-off control in the pre-charging exposure device 6 in operations other than the image forming operation.

As described above, according to this embodiment, the fluctuation in charging voltage by the pre-charging exposure can be suppressed.

In this embodiment, the constitutions and the operations of the process cartridges Sa, Sb, Sc, and Sd are substantially the same except that the colors of the toner images to be formed are different from each other, and therefore, the above-described functional effect was obtained by carrying out control such that the turning-on/turning-off timings of the pre-charging exposure devices are made different from each other. However, in order to obtain the above-described functional effect, it is important to make timings when potential step portions of the surface potentials of the photosensitive drums 1 by the turning-on/turning-off reach the contact portions thereof with the charging rollers 2 different from each other.

Accordingly, for example, even when the turning-on/turning-off timing of the pre-charging exposure device is the same for all the stations, in the case where the following constitution is employed, a functional effect similar to the functional effect in this embodiment can be obtained. That is, the functional effect similar to the functional effect in this embodiment can be obtained when the constitutions of the process cartridge and the irradiation position of the pre-charging exposure device 6 are different for every process cartridge and the timing when the potential step portion of the surface potential of the photosensitive drum 1 reaches the contact portion thereof with the charging roller 2 is different for every process cartridge.

In this embodiment, control in which the turning-on timing of the light emitting element 301 is shifted between the process cartridges S while increasing the emitted light quantity of the light emitting element 301 of the pre-charging exposure device 6 in a shortest time by control of OnDuty of the PWM signal from 0% to 100% was carried out. A method in which the load fluctuation to the power source (voltage generating circuit 601) for supplying the charging voltage is not concentrated is not limited to the method in this embodiment, but may also be, for example, a method in which the load fluctuation is made small by gradually changing the emitted light quantity of the light emitting element 301. FIG. 9 is a timing chart showing changes in items identical to those in the timing chart of FIG. 7 in the case where the emitted light quantity of the light emitting element 301 of the pre-charging exposure device 6 is gradually changed using the image forming apparatus 100. In FIG. 9, the abscissa represents a time, and t10 to t14 represents timings (times). Further, in FIG. 9, items indicated in the ordinate are similar to those in FIG. 7 described above, so that a manner of understanding of FIG. 9 will be omitted from description.

In another embodiment shown in FIG. 9, similarly as in the above-described comparison example shown in FIG. 8, in the process cartridges Sa, Sb, and Sc to which the power source for supplying the charging voltage is common, light emission timings when the light emitting elements 301 of the pre-charging exposure devices 6 are turned on are the same time t13. However, in FIG. 9, the emitted light quantity of the light emitting element 301 is changed by changing the OnDuty of the PWM signal from 0% to 100% stepwise gradually. For that reason, compared with FIG. 8, a degree of the displacement (potential step) of the surface potential on the photosensitive drum 1 in FIG. 9 becomes small. For that reason, at the timing D1 when the irradiation portion on the photosensitive drum 1 irradiated with the light from the light emitting element 301 of the pre-charging exposure 6 reaches the contact portion thereof with the charging roller 2, the abrupt and large load fluctuation can be suppressed, so that the charging voltage output can be stabilized.

Thus, the influence on the charging voltage output becomes smaller with a gentler change ratio of the emitted light quantity of the light emitting element 301 of the pre-charging exposure device 6 to a time, but it is preferable that a region in which the emitted light quantity is changed and an image region do not overlap with each other. Accordingly, the emitted light quantity of the light emitting element 301 may only be required to be changed with, for example, a change ratio such that feed-back of the charging voltage output is achieved or a change ratio such that the fluctuation in charging voltage output becomes a certain value or less (for example, less than about 10 V). Specifically, in the case where a time in which the OnDuty of the PWM signal for controlling the emitted light quantity of the light emitting element 301 is changed from 0% to 100% falls within a toner image required to move the photosensitive drum 1 in the rotational direction by 30 mm, even when some output fluctuation in charging voltage occurs, the influence on the image is not readily recognized visually. In the image forming apparatus 100 in this embodiment, the process speed is 148 mm/sec, and therefore, the time required for moving the photosensitive drum 1 in the rotational direction by 30 mm is within about 202 milliseconds. Incidentally, in the above-described another constitution, only the turning-on control of the light emitting element 301 of the pre-charging exposure device 6 was described, but the turning-off control of the light emitting element 301 may also be similarly carried out.

As described above, according to another embodiment described above, the fluctuation in charging voltage by the pre-charging exposure can be suppressed.

In the embodiment 1, the constitution in which the turning-on/turning-off timing of the light emitting element of the pre-charging exposure device is different between the process cartridges to which the power source for supplying the charging voltage is common was described. In an embodiment 2, a constitution in which between the process cartridges to which the power source for supplying the charging voltage is common, the turning-on/turning-off timing of the light emitting element of the pre-charging exposure device is made later than the turning-on/turning-off timing in the embodiment 1 to the extent possible will be described. Incidentally, the constitution of the image forming apparatus 100 in this embodiment (embodiment 2) is similar to the embodiment 1, and devices and members similar to those in the embodiment 1 will be omitted from description in this embodiment by using the same reference numerals or symbols as those in the embodiment 1.

[Light Emission/Light-Out Control of Pre-Charging Exposure Device]

FIG. 10 is a timing chart showing states of the pre-charging exposure devices 6, the photosensitive drums 1, the charging voltage, and the like during the printing operation of the image forming apparatus 100 in this embodiment. In FIG. 10, the abscissa represents a time, and t20 to t34 represents timings (times). Further, in FIG. 10, items indicated in the ordinate are similar to those in FIG. 7 of the embodiment 1 described above, so that a manner of understanding of FIG. 8 will be omitted from description.

As shown in FIG. 10, also in this embodiment, the pre-charging exposure device **6*a* starts the discharge by turning on the light emitting element 301 at a time t23 in preparation for the image formation (start of exposure) in the process cartridge Sa. Further, the pre-charging exposure device 6*b* starts the discharge by turning on the light emitting element 301 at a time t25 in preparation for the image formation (start of exposure) in the process cartridge Sb. Similarly, the pre-charging exposure device 6*c* starts the discharge by turning on the light emitting element 301 at a time t27 in preparation for the image formation (start of exposure) in the process cartridge Sc. Thus, also in this embodiment, similarly as in the embodiment 1, the turning-on timings of the light emitting elements 301 of the pre-charging exposure devices 6 in the process cartridges S are shifted from each other. Further, a feature of this embodiment is such that the timings of the light emitting elements 301 of the pre-charging exposure devices 6** in the process cartridges S are made later as can be possible.

[Light Emission/Light-Out Timing of Pre-Charging Exposure Device]

The light emission timing of the light emitting element 301 of the pre-charging exposure device 6 in this embodiment will be described. FIG. 11 is a sectional view showing a structure of the photosensitive drum 1 and a periphery thereof in the process cartridge S, and illustration of the cleaning device 5 is omitted. In FIG. 11, L indicated by a thick arrow is laser light emitted from the scanner unit 3 to the photosensitive drum 1. Further, arrows in the developing roller 22 and the charging roller 2 show rotational directions of the developing roller 22 and the charging roller 2. Similarly, an arrow indicated by R1 is a rotational direction of the photosensitive drum 1. Further, in FIG. 11, d1 represents a length of the surface of the photosensitive drum 1 between an exposure irradiation position by the laser light from the scanner unit to an irradiation position (irradiation portion) by the light emitting element 301 of the pre-charging exposure device 6. Further, d2 represents a length of one-full circumference of the surface of the photosensitive drum 1.

FIG. 12 is a timing chart showing progression of various states relating to the process cartridge Sa which is the yellow station in the form extracted from FIG. 10. In FIG. 12, the charging voltage output, the emitted light quantity of the pre-charging exposure device 6*a*, the surface potential of the irradiation portion of the photosensitive drum 1*a* irradiated in the light from the pre-charging exposure device 6*a*, and the timing when the image forming region of the photosensitive drum 1*a* passes through the contact portion thereof with the charging roller 2*a*. Further, t20 to t24, ta, tb, and Dy1 shown in FIG. 12 are timings shown below.

- t20: print instruction receiving timing
- t21: charge start time (timing)
- t22: time (charging) when charge start portion of photosensitive drum 1 reached irradiation portion irradiated with light from light emitting element 301 of pre-charging exposure device 6
- t23: light emission start time (timing) of light emitting element 301 of pre-charging exposure device 6*a*
- t24: image formation start time (also exposure start time) (timing) of yellow station (process cartridge Sa)
- ta: timing earlier by d2 (length of one-full circumference of photosensitive drum 1) than exposure start time t24
- tb: timing earlier by d1 (length between exposure irradiation position and pre-charging exposure irradiation position) than exposure start time t24
- Dy1: time (timing) when irradiation position (irradiation portion) by light emitting element 301 of pre-charging exposure device 6*a* of photosensitive drum 1 reached charging roller 2*a*

In the above, "length" is a length on the surface of the photosensitive drum 1. Further, a period T1 and a period T2 are represented by (period T1)=(time t24)−(time ta) and (period T2)=(time t24)−(time tb), respectively.

The light emission start timing t23 of the light emitting element 301 of the pre-charging exposure device 6 will be described.

In the constitution using the pre-charging exposure device 6, the surface potential of the photosensitive drum 1 is changed in state from the state of −300 V to the state of −20 V by discharge by the pre-charging exposure device 6. Further, by the electric discharge by the charging roller 2, the surface potential of the photosensitive drum 1 is charged from the state of −20 V to the state of −700 V. For that reason, compared with the case where there is no discharge by the pre-charging exposure device 6, a charging contrast (potential difference between the charging voltage and the surface potential of the photosensitive drum 1) is large and an electric process discharge amount generating during the charging also becomes large, and therefore, NOx, which is an electric discharge product, is liable to generate. Then, when the electric discharge product is accumulated on the photosensitive drum 1, a surface resistance on the photosensitive drum 1 lowers, so that image flow such that the formed electrostatic latent image is disturbed by charging the surface of the photosensitive drum 1 more than necessary is liable to occur. As described above, although the turning-on timing of the light emitting element 301 of the pre-charging exposure device 6 is made earlier than the image formation start (exposure start) (timing), the turning-on of the light emitting element 301 being performed earlier than necessary is not preferred from a viewpoint of accumulation of the electric discharge product. For that reason, the turning-on of the light emitting element 301 of the pre-charging exposure device 6 may only be required to be started between the exposure start timing when the image formation is started in a subsequent cyclic period and a time earlier by a time shorter than a time which is earlier than the exposure start timing and which is required for movement of the photosensitive drum 1 through one-full circumference. By this, the number of times of application of the charging voltage in a discharged state by the pre-charging exposure device 6 is at most once or less. Accordingly, generation of the electric discharge product can be minimized. Thus, from the viewpoint of accumulation of the electric discharge product, the light emission timing t23 of the light emitting element 301 of the pre-charging exposure device 6*a* may preferably be the time ta and later.

Further, also, in order not to change an electric charge state of the photosensitive drum 1 in the image forming region of the photosensitive drum 1, the light emission timing t23 of the light emitting element 301 of the pre-charging exposure device 6*a* may preferably be the following timing. That is, the light emission timing t23 may preferably be earlier than the exposure start timing by at least a time T2 (=d2 (mm)/148 (mm/sec)) corresponding to the length d2 between the exposure irradiation position on the photosensitive drum 1 and the irradiation position of the light emitting element 301 of the pre-charging exposure device 6. Accordingly, the timing t23 of the pre-charging exposure device 6*a* may preferably be earlier than the time tb. An electric charge (carrier, hole) generation state in the photosensitive drum 1 is different between when the photosensitive drum 1 is charged in a state in which the photosensitive drum 1 is not discharged and when the photosensitive drum 1 is charged in a state in which the photosensitive drum 1 is discharged. For that reason, when the light emission of the light emitting element 301 of the pre-charging exposure device 6*a* is made at the time t23 and later, in the image forming region of the photosensitive drum 1, a portion different in electric charge state generates in the photosensitive drum 1. In order to avoid this generation of the portion, the light emission timing t23 of the light emitting element 301 of the pre-charging exposure device 6*a* may preferably be earlier than the time tb. In summary, the light emission timing t23 may preferably satisfy (light emission timing t22)<(time tb) from viewpoints of suppression of the image flow and stabilization of the electric charge state of the photosensitive drum 1.

In the above, the light emission timing t23 of the light emitting element 301 of the pre-charging exposure device 6*a* corresponding to the process cartridge Sa was described. Also, light emission timings t25 and t27 are set, similarly as in the case of the pre-charging exposure device 6, between times corresponding to the times to and tb shown in FIG. 12, for the process cartridges Sb and Sc, respectively.

Incidentally, from a viewpoint of suppression of the generation of the electric discharge product, the light emitting element 301 of the pre-charging exposure device 6 may preferably be turned off quickly when the image formation by each of the process cartridges S is ended. For that reason, in this embodiment, as shown in FIG. 10, as regards the process cartridge Sa, the light emitting element 301 of the pre-charging exposure device 6*a* is turned off at a time t30 after a time t29 when the image formation is ended. Further, as regards the process cartridge Sb, the light emitting element 301 of the pre-charging exposure device 6*b* is turned off at a time t32 after a time t31 when the image formation is ended. Similarly, as regards the process cartridge Sc, the light emitting element 301 of the pre-charging exposure device 6*c* is turned off at a time t34 after a time t33.

As described above, by shifting the light emission timing of the discharging device, a minimum emitted light quantity is realized while suppressing the abrupt load fluctuation of the charging voltage, so that the generation of the electric discharge product can be suppressed, with the result that the image flow can be suppressed.

As described above, according to this embodiment, the fluctuation in charging voltage by the pre-charging exposure can be suppressed.

In an embodiment 3, an embodiment in which the light emission timing of the light emitting element of the pre-charging exposure device is shifted for every process cartridge in a constitution in which a reference potential of the photosensitive drum is changed from those in the above-described embodiments 1 and 2 will be described.

[Constitution of High-Voltage Power Source of Image Forming Apparatus]

FIG. 13 is a schematic sectional view for illustrating a constitution of the high-voltage power source for supplying a high voltage to the process cartridges Sa to Sd and the like of an image forming apparatus 100 of the embodiment 3. FIG. 13 shows which high-voltage power source supplies the voltages to the charging roller 2, the developing roller 22, and the primary transfer roller 14 of each of the process cartridges S. In FIG. 6 of the embodiment 1, a constitution in which the photosensitive drums 1 of the process cartridges Sa to Sd are connected to the ground (0 V) and in which to the primary transfer(s) 14 as the transfer member(s), the primary transfer voltage generated by the primary transfer power source 15 is applied is employed. On the other hand, in this embodiment, a constitution in which to the photosensitive drums 1, a drum voltage (−300 V in this embodiment) is applied from a drum power source 607 (hereinafter, this constitution is referred to as a drum voltage constitution) is employed. Thus, in this embodiment, compared with the embodiment 1, the voltage constitution of the photosensitive drums 1 and the primary transfer rollers 14 are different. In the drum voltage constitution in this embodiment, the electrostatic latent image formed on each photosensitive drum 1 and the developing voltage applied to the developing roller(s) 22 are generated based on the reference potential of −300 V.

The photosensitive drum 1 is connected to the ground (0 V), and the electrostatic latent image is formed on the photosensitive drum 1 with respect to a ground potential (0 V). In this embodiment, a voltage applied to the charging roller 2 is −1300 V, and the surface potential of the photosensitive drum 1 after being charged by the charging roller 2 becomes about −700 V. Further, the surface potential of the photosensitive drum 1 after exposure thereof irradiated with the laser light L from the scanner unit 3 becomes about −70 V, and a developing voltage applied to the developing roller 22 is set at about −330 V, so that the toner is deposited on the electrostatic latent image and thus the development is carried out.

On the other hand, in this embodiment, to the photosensitive drums 1, −300 V is applied from the drum power source 607, and therefore, the electrostatic latent images formed on the photosensitive drums 1 and the developing voltage applied to the developing rollers 22 are created with respect to −300 V, which is the reference potential. Accordingly, in this embodiment, to the charging roller(s) 2, −1600 V is applied as the charging voltage, so that the surface potential of each photosensitive drum 1 after the charging is made about −1000 V, the surface potential of each photosensitive drum 1 after the exposure is made about −370 V, and the developing voltage is made about −630 V. Further, the primary transfer rollers 14 are connected to the ground (0 V), and therefore, the primary transfer is carried out by a potential difference between the reference potential of −300 V of the photosensitive drum 1 and the potential of 0 V of the primary transfer roller. Incidentally, the constitution of the image forming apparatus 100 in this embodiment (embodiment 3) is similar to the embodiments 1 and 2 except for the above-described difference in power source circuit constitution, and devices and members similar to those in the embodiments 1 and 2 will be omitted from description in this embodiment by using the same reference numerals or symbols as those in the embodiment 1.

[Light Emission/Light-Out Timing of Pre-Charging Exposure Device]

Also, in this embodiment, by carrying out control such that the light emission timing of the pre-charging exposure device 6 is shifted between the process cartridges Sa, Sb, and Sc to which the charging power source (voltage generating circuit 601) is common, as the drum voltage constitution, a simple power source constitution with no primary transfer power source can be realized. Further, also in a constitution such that the charging voltage is high as in the drum voltage constitution in this embodiment, the load fluctuation due to the displacement of the surface potential of the photosensitive drum 1 can be suppressed, and therefore, the fluctuation in charging voltage output of the high voltage is suppressed, so that the charging voltage output can be stabilized. In the following, a reason therefor will be described.

In the drum voltage constitution in this embodiment, by applying the drum voltage (−300 V) to the photosensitive drums 1, the reference potential of the negative polarity lower than 0 V (ground potential) is formed. For that reason, in order to form the electrostatic latent image against the reference potential, the surface potential on the photosensitive drum 1 is required to be made high on the negative polarity side by a value corresponding to the reference potential, with the result that the charging voltage is also required to be made high on the negative polarity side. As regards the high-voltage power source, a load exerted on the high-voltage power source becomes heavier with a higher absolute value of the output voltage, so that the charging power source which is the high-voltage power source for generating the charging voltage is liable to be influenced by the load fluctuation. For that reason, in the drum voltage constitution, when the load fluctuation generates, fluctuations (undershoot and overshoot) in charging voltage output of the charging voltage outputted by the charging power source are liable to occur. In this embodiment, similarly as in the above-described embodiments 1 and 2, the light emission timing of the light emitting element 301 of the pre-charging exposure device 6 is shifted between the process cartridges Sa, Sb, and Sc to which the charging power source (voltage generating circuit 601) is common. By this, even in the power source constitution in which the charging voltage is high, the load fluctuation due to the displacement of the surface potential of the photosensitive drum 1 is suppressed, so that the charging voltage output can be stabilized.

Further, the load fluctuation due to the surface potential of the photosensitive drum 1 becomes large in proportion to emitted light intensity (emitted light quantity) of the discharging light emitted from the light emitting element 301 of the pre-charging exposure device 6. In the case where the potential difference between the surface potential of the photosensitive drum 1 and the charging voltage of the charging roller 2 is large, a larger charging current flows for charging the photosensitive drum 1, so that the influence of the load fluctuation on the voltage generating circuit 601 also becomes large. That is, when the emitted light intensity is strong (when the emitted light quantity is large), the surface potential of the photosensitive drum 1 approaches 0 V, and therefore, the potential difference between the charging voltage and the surface potential of the photosensitive drum 1 becomes large, with the result that the load fluctuation also becomes large.

Further, apparently, even when the surface potential of the photosensitive drum 1 is the same, the load fluctuation becomes larger with stronger emitted light intensity of the discharging light of the light emitting element 301 of the pre-charging exposure device 6. This is due to a property of the photosensitive drum 1. Even in the case where there is no electric charge on the surface of the photosensitive drum 1, in a layer inside the photosensitive drum 1, a part of the electric charges remains (hereinafter referred to as remaining charges). The amount of electric charges generating in the inside layer of the photosensitive drum 1 is proportional to the emitted light intensity of the discharging light emitted from the light emitting element 301 of the pre-charging exposure device 6. For that reason, even when the surface potential of the photosensitive drum 1 is a desired potential, if the emitted light intensity of the light emitting element 301 is strong, the remaining charges are liable to generate inside the photosensitive drum 1. Accordingly, when the remaining charges exist in a large amount in the inside layer of the photosensitive drum 1, the charging current flows in a large amount so as to cancel the remaining charges during the charging by the charging roller, and therefore, the load fluctuation becomes larger with stronger emitted light intensity of the discharging light emitted from the light emitting element 301 of the pre-charging exposure device 6.

On the other hand, in the case where a simple constitution in which the drum voltage constitution in this embodiment is employed and the primary transfer rollers 14 are connected to the ground (0 V), it is difficult to increase the primary transfer contrast (potential difference between the surface potential of the photosensitive drum 1 and the voltage of the primary transfer roller 14). As a result, the primary transfer current does not flow in a large amount, so that an absolute value of the surface potential of the photosensitive drum 1 after the primary transfer is liable to become high.

For that reason, there is a need to also increase the emitted light quantity of the light emitting element 301 of the pre-charging exposure device 6. As a result, as described above, in the case where the emitted light quantity of the discharging light emitted from the light emitting element 301 of the pre-charging exposure device 6 is large, the load fluctuation due to the potential step of the surface potential of the photosensitive drum 1 becomes large. For that reason, in this embodiment, the light emission timing (turning on timing) of the light emitting element 301 of each of the pre-charging exposure devices 6 is shifted so that the influence of the load fluctuation is not exerted at the same timing while making the surface potential of the photosensitive drum 1 uniform by the discharge with the pre-charging exposure device 6. By this, also, in this embodiment, an effect such that in the charging voltage output, an abrupt and large load fluctuation is not generated is achieved.

Further, also, even when the light emitting element 301 of the pre-charging exposure device 6 is turned off, the load fluctuation due to the potential step of the surface potential of the photosensitive drum 1 becomes large before and after the turning-off timing of the light emitting element 301 of the pre-charging exposure device 6. For that reason, in this embodiment, in order that the influence of the load fluctuation is not concentrated at the same timing while making the surface potential of the photosensitive drum 1 uniform in the discharge by the pre-charging exposure device 6, the turning-off timing of the light emitting element 301 of the pre-charging exposure device 6 is shifted. By this, also, during the turning-off of the light emitting element 301 of the pre-charging exposure device 6, in the charging voltage output, an effect such that the abrupt and large load fluctuation is not generated is achieved. As described above, also, in the image forming apparatus according to this embodiment with the simple power source constitution, in which the primary transfer power source is not provided, different from those in the embodiments 1 and 2, a good charging performance can be realized.

As described above, according to this embodiment, the fluctuation in charging voltage by the pre-charging exposure can be suppressed.

According to the present invention, it is possible to suppress the fluctuation of the charging voltage with the displacement of the surface potential of the photosensitive drum due to the pre-charging exposure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042224 filed on Mar. 17, 2022, which is hereby incorporated by reference herein in its entirety.

What is claimed is:

1. An image forming apparatus comprising:

a first image forming portion including a first photosensitive member, a first charging member configured to electrically charge a surface of the first photosensitive member, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element;

a second image forming portion including a second photosensitive member, a second charging member configured to electrically charge a surface of the second photosensitive member, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element;

a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, wherein the controller carries out control so as to change a timing of a start of discharge of the first photosensitive member and a timing of a start of discharge of the second photosensitive member by causing the power source portion to apply the charging voltage to the first charging member and the second charging member, and wherein the controller carries out control so that a timing of a start of discharge of the first photosensitive member in the first image forming portion is made earlier than a timing of a start of image formation by the first image forming portion and so that a timing of a start of discharge of the second photosensitive member in the second image forming portion is made earlier than a timing of a start of image formation by the second image forming portion.

2. An image forming apparatus according to claim 1, wherein the controller carries out control so that a later timing of the timing of the start of the discharge of the first photosensitive member and the timing of the start of the discharge of the second photosensitive member is made earlier than an earlier timing of the timing of the start of the image formation by the first image forming portion and the timing of the start of the image formation by the second image forming portion.

3. An image forming apparatus according to claim 1, further comprising an exposure portion configured to form the electrostatic latent images on the first photosensitive member and the second photosensitive member by exposing the first photosensitive member and the second photosensitive member to light, wherein the controller carries out control:

so that the timing of the start of the discharge of the first photosensitive member in the first image forming portion is a timing from a timing when a region in which an image is formed on the first photosensitive member in a subsequent cyclic period passes through an irradiation portion irradiated with light from the exposure portion to a timing when the region passes through an irradiation portion irradiated with light from the light emitting element of the first discharging portion, and so that the timing of the start of the discharge of the second photosensitive member in the second image forming portion is a timing from a timing when a region in which an image is formed on the second photosensitive member in a subsequent cyclic period passes through an irradiation portion irradiated with light from the exposure portion to a timing when the region passes through an irradiation portion irradiated with light from the light emitting element of the second discharging portion.

4. An image forming apparatus according to claim 1, wherein the first discharging portion is provided on a side downstream of the first transfer portion and upstream of the first charging member with respect to a rotational direction of the first photosensitive member, and wherein the second discharging portion is provided on a side downstream of the second transfer portion and upstream of the second charging member with respect to a rotational direction of the second photosensitive member.

5. An image forming apparatus according to claim 4, wherein the first transfer portion includes a first transfer member for transferring the toner image from the first photosensitive member onto the toner image receiving member and to which a voltage of a negative polarity is applied, and the first photosensitive member is connected to a ground potential, and wherein the second transfer portion includes a second transfer member for transferring the toner image from the second photosensitive member onto the toner image receiving member and to which a voltage of the negative polarity is applied, and the second photosensitive member is connected to the ground potential.

6. An image forming apparatus according to claim 1, wherein the photosensitive member comprises a photosensitive drum.

7. An image forming apparatus comprising:

a first image forming portion including a first photosensitive member, a first charging member configured to electrically charge a surface of the first photosensitive member in a first charging portion, a first developing member configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element;

a second image forming portion including a second photosensitive member, a second charging member configured to electrically charge a surface of the second photosensitive member in a second charging portion, a second developing member configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element;

a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, wherein the controller carries out control so as to change a timing when a first region discharged when discharge of the first photosensitive member is started reaches the first charging portion and a timing when a second region discharged when discharge of the second photosensitive member is started reaches the second charging portion, by causing the power source portion to apply the charging voltage to the first charging member and the second charging member, and wherein the controller carries out control so that a timing of a start of discharge of the first photosensitive member in the first image forming portion is made earlier than a timing of a start of image formation by the first image forming portion and so that a timing of a start of discharge of the second photosensitive member in the second image forming portion is made earlier than a timing of a start of image formation by the second image forming portion.

8. An image forming apparatus according to claim 7, wherein the controller carries out control so that a later timing of the timing of the start of the discharge of the first photosensitive member and the timing of the start of the discharge of the second photosensitive member is made earlier than an earlier timing of the timing of the start of the image formation by the first image forming portion and the timing of the start of the image formation by the second image forming portion.

9. An image forming apparatus according to claim 7, wherein the first discharging portion is provided on a side downstream of the first transfer portion and upstream of the first charging member with respect to a rotational direction of the first photosensitive member, and wherein the second discharging portion is provided on a side downstream of the second transfer portion and upstream of the second charging member with respect to a rotational direction of the second photosensitive member.

10. An image forming apparatus according to claim 9, wherein the first transfer portion includes a first transfer member for transferring the toner image from the first photosensitive member onto the toner image receiving member and to which a voltage of a negative polarity is applied, and the first photosensitive member is connected to a ground potential, and wherein the second transfer portion includes a second transfer member for transferring the toner image from the second photosensitive member onto the toner image receiving member and to which a voltage of the negative polarity is applied, and the second photosensitive member is connected to the ground potential.

11. An image forming apparatus according to claim 7, wherein the photosensitive member comprises a photosensitive drum.

* * * * *